US012736074B2

(12) United States Patent
Katz

(10) Patent No.: US 12,736,074 B2
(45) Date of Patent: Sep. 15, 2026

(54) SOLAR PANEL MOUNTING CONFIGURATION

(71) Applicant: Tamarack Solar Products, Inc., Eureka, CA (US)

(72) Inventor: David Katz, Arcata, CA (US)

(73) Assignee: Tamarack Solar Products, Inc., Arcata, CA (US)

( * ) Notice: Subject to any disclaimer, the term of this patent is extended or adjusted under 35 U.S.C. 154(b) by 4 days.

(21) Appl. No.: 18/777,918

(22) Filed: Jul. 19, 2024

(65) Prior Publication Data

US 2025/0020149 A1 Jan. 16, 2025

Related U.S. Application Data

(63) Continuation of application No. 17/806,692, filed on Jun. 13, 2022, now Pat. No. 12,044,268, which is a (Continued)

(51) Int. Cl.
*F16B 5/06* (2006.01)
*F16B 2/04* (2006.01)
(Continued)

(52) U.S. Cl.
CPC .............. *F16B 5/0685* (2013.01); *F16B 2/04* (2013.01); *F16B 2/065* (2013.01); *F16B 2/10* (2013.01); *F16B 7/0413* (2013.01); *F16B 7/0473* (2013.01); *F16B 7/187* (2013.01); *F24S 25/37* (2018.05); *H02S 20/20* (2014.12);
(Continued)

(58) Field of Classification Search
CPC ........ F16B 5/0685; F16B 7/0473; F16B 2/10; F16B 7/0413; F16B 7/187; F16B 2/04; F16B 2/065; H02S 20/20; H02S 30/00; F24S 25/37; F24S 2025/6003; F24S 2025/801; F24S 25/30; F24S 2025/6007; F24S 2025/804; F24S 25/636;
(Continued)

(56) References Cited

U.S. PATENT DOCUMENTS 4,901,963 A * 2/1990 Yoder .................... B25B 5/103 24/514
4,953,820 A * 9/1990 Yoder .................... B25B 5/103 248/231.51

(Continued)

OTHER PUBLICATIONS

United States Patent and Trademark Office, Notice of Allowance received for U.S. Appl. No. 18/961,142, dated Apr. 16, 2025, 11 pages, U.S.

(Continued)

*Primary Examiner* — Muhammad Ijaz
(74) *Attorney, Agent, or Firm* — Alston & Bird LLP

(57) ABSTRACT

Mounting clamps may be utilized to quickly and easily secure solar panel modules relative to mounting rails, which may in turn be secured relative to a mounting surface (e.g., a roof). The mounting clamps may be configured to quickly secure the solar pane modules relative to the mounting rails by tightening a tightening element to pull a clamp element toward the surface of a mounting rail, thereby clamping a portion (e.g., a frame) of a solar panel module between the clamping element and an outer surface of the mounting rail.

20 Claims, 37 Drawing Sheets

Related U.S. Application Data continuation of application No. 16/215,266, filed on Dec. 10, 2018, now Pat. No. 11,384,780.

(60) Provisional application No. 62/660,438, filed on Apr. 20, 2018, provisional application No. 62/598,249, filed on Dec. 13, 2017.

(51) Int. Cl.

| | |
|---|---|
| ***F16B 2/06*** | (2006.01) |
| ***F16B 2/10*** | (2006.01) |
| ***F16B 7/04*** | (2006.01) |
| ***F16B 7/18*** | (2006.01) |
| ***F24S 25/37*** | (2018.01) |
| ***H02S 20/20*** | (2014.01) |
| ***H02S 30/00*** | (2014.01) |
| *F24S 25/00* | (2018.01) |
| *F24S 25/60* | (2018.01) |

(52) U.S. Cl.
CPC ....... *H02S 30/00* (2013.01); *F24S 2025/6003* (2018.05); *F24S 2025/801* (2018.05)

(58) Field of Classification Search
CPC ......... F24S 25/65; F24S 25/632; Y02E 10/47; Y02E 10/50; Y02B 10/20
USPC ........................................................ 248/274.1
See application file for complete search history.

(56) References Cited

U.S. PATENT DOCUMENTS 5,014,950 A * 5/1991 Ohman ..................... F16B 2/10 248/500
6,032,939 A * 3/2000 Chen ....................... B25B 1/103 269/251
7,021,855 B2 * 4/2006 Hardtke .................. F16B 2/065 403/256
7,997,839 B1 * 8/2011 Gallegos ................... B60R 7/08 410/102
8,122,648 B1 * 2/2012 Liu ......................... F24S 25/61 52/173.3
8,181,926 B2 * 5/2012 Magno, Jr. ............ F24S 25/636 248/220.21
8,344,239 B2 * 1/2013 Plaisted ................ F24S 25/636 136/251
8,387,319 B1 * 3/2013 Gilles-Gagnon ....... F24S 25/33 52/173.3
8,505,864 B1 * 8/2013 Taylor ..................... H02S 20/23 52/173.3
8,590,222 B2 * 11/2013 Koller ..................... F24S 25/35 52/173.3
8,683,761 B2 * 4/2014 Danning ................. H02S 20/23 52/173.3
8,733,027 B1 * 5/2014 Marston ................ F24S 25/636 52/173.3
8,839,575 B1 * 9/2014 Liu ....................... F24S 25/613 52/173.3
8,925,263 B2 * 1/2015 Haddock ................. H02S 20/23 52/173.3
8,935,893 B2 * 1/2015 Liu ......................... F24S 25/61 52/173.3
9,010,041 B2 * 4/2015 Danning ............... F16B 5/0233 52/173.3
9,011,034 B2 * 4/2015 Liu ....................... F24S 25/615 403/381
D732,698 S * 6/2015 Meng ............................. D25/61
9,097,443 B2 * 8/2015 Liu ......................... F24S 25/33
9,134,044 B2 * 9/2015 Stearns ................... E04D 13/14
9,147,986 B2 * 9/2015 Redel .................... F24S 25/634
9,160,273 B2 * 10/2015 Schuit ..................... H02S 20/00
9,175,878 B2 * 11/2015 Kemmer ................. H02S 20/23
9,249,813 B2 * 2/2016 Kalman .................. B64C 1/403
9,273,708 B2 * 3/2016 Urban ..................... F24S 25/65
9,472,866 B1 * 10/2016 Seelig ....................... H01R 4/64
9,473,066 B2 * 10/2016 Stephan .................. F24S 25/61
9,506,600 B1 * 11/2016 Li ........................... H02S 20/23
9,531,319 B2 * 12/2016 Braunstein .............. H02S 20/23
9,577,571 B2 * 2/2017 Atia ...................... F24S 25/613
9,689,411 B2 * 6/2017 Meine ........................ F16B 2/12
9,712,106 B2 * 7/2017 Wentworth ............. F24S 25/70
9,745,754 B1 * 8/2017 Narita ..................... H02S 20/23
9,825,581 B2 * 11/2017 Wildes .................... F24S 25/61
9,893,677 B1 * 2/2018 Liu ......................... H02S 20/23
10,128,790 B2 * 11/2018 Ash ...................... H01R 25/162
10,186,791 B2 * 1/2019 Meine ....................... H01R 9/18
10,218,305 B1 * 2/2019 Schrock .................. H02S 20/20
10,312,853 B2 * 6/2019 MacRostie ............ F24S 25/636
10,330,249 B1 * 6/2019 Polen ........................ F16B 2/10
10,511,251 B2 * 12/2019 Kobayashi ............ F24S 25/632
10,605,282 B1 * 3/2020 Young ................... F16B 5/0685
10,707,803 B2 * 7/2020 Pretorius ................. H02S 99/00
10,727,780 B2 * 7/2020 Kobayashi ............. F24S 25/33
10,742,162 B2 * 8/2020 Kobayashi ............. H02S 20/23
10,749,459 B1 * 8/2020 Liu ....................... F16B 5/0685
11,221,034 B1 * 1/2022 Katz ......................... F16B 2/10
11,384,780 B2 7/2022 Katz
11,601,087 B2 * 3/2023 Ash ........................... F16B 2/12
12,044,268 B2 7/2024 Katz
2005/0095062 A1 * 5/2005 Iverson ..................... F16B 2/10 403/256
2008/0000173 A1 * 1/2008 Lenox ..................... F24S 25/20 52/173.1
2008/0250614 A1 * 10/2008 Zante .................... F16B 5/0657 24/542
2008/0292424 A1 * 11/2008 Kufner .................... F24S 25/30 411/277
2009/0230257 A1 * 9/2009 Reyen ..................... E04H 15/18 135/121
2010/0276558 A1 * 11/2010 Faust ...................... F24S 25/12 248/316.1
2010/0284737 A1 * 11/2010 McPheeters ............ F24S 25/10 52/173.1
2011/0001030 A1 * 1/2011 Hochreiter ............ F24S 25/636 248/316.1
2011/0100434 A1 * 5/2011 Van Walraven ...... F24S 25/636 136/251
2011/0138585 A1 * 6/2011 Kmita ................... F24S 25/636 24/522
2011/0179727 A1 * 7/2011 Liu ......................... F24S 25/61 52/173.3
2011/0214365 A1 * 9/2011 Aftanas ................. F24S 25/636 52/173.3
2011/0214367 A1 * 9/2011 Haddock ............... F24S 25/615 52/173.3
2011/0260027 A1 * 10/2011 Farnham, Jr. ........... F24S 25/35 248/309.1
2011/0314752 A1 * 12/2011 Meier ...................... F24S 25/20 52/173.3
2012/0102853 A1 * 5/2012 Rizzo ...................... F24S 25/61 52/173.3
2012/0248271 A1 * 10/2012 Zeilenga ................. H02S 20/00 248/231.41
2012/0304556 A1 * 12/2012 Teller ...................... E04D 13/10 248/237
2012/0325761 A1 * 12/2012 Kubsch ................... F24S 25/35 211/41.1
2013/0291479 A1 * 11/2013 Schaefer ................. F24S 25/70 52/745.21
2013/0294814 A1 * 11/2013 Sader .................... F24S 25/636 403/21
2014/0255090 A1 * 9/2014 Oravits ..................... F16B 2/10 403/338
2014/0311553 A1 * 10/2014 Haddock ................. F24S 25/61 136/251
2015/0040967 A1 * 2/2015 West ....................... H02S 20/24 403/345
2015/0052712 A1 * 2/2015 Markiewicz ............ H02S 20/00 24/569

(56) References Cited

U.S. PATENT DOCUMENTS

| | | | | |
|---|---|---|---|---|
| 2015/0068010 | A1* | 3/2015 | Klingler | F16B 2/10 24/457 |
| 2015/0183066 | A1* | 7/2015 | Lippert | F24S 25/636 29/428 |
| 2015/0247326 | A1* | 9/2015 | Haddock | F24S 25/615 52/705 |
| 2015/0249423 | A1* | 9/2015 | Braunstein | F16B 5/0685 52/173.3 |
| 2015/0270027 | A1* | 9/2015 | Schrock | H01R 13/24 52/173.3 |
| 2015/0280334 | A1* | 10/2015 | McPheeters | H01R 4/34 439/573 |
| 2015/0288320 | A1* | 10/2015 | Stearns | F24S 25/60 52/173.3 |
| 2016/0069592 | A1* | 3/2016 | Giraudo | F24S 25/00 248/220.21 |
| 2016/0108941 | A1* | 4/2016 | Schaefer | F24S 25/636 248/222.14 |
| 2016/0111995 | A1* | 4/2016 | Nayar | F24S 25/636 211/41.1 |
| 2016/0111996 | A1* | 4/2016 | Stephan | H02S 20/23 248/316.6 |
| 2016/0111997 | A1* | 4/2016 | Ganshaw | F24S 25/61 248/224.7 |
| 2016/0111999 | A1* | 4/2016 | Stapleton | F24S 25/632 52/173.3 |
| 2016/0268958 | A1* | 9/2016 | Wildes | H02S 20/23 |
| 2016/0329671 | A1* | 11/2016 | Kokenda | H02G 5/002 |
| 2016/0344338 | A1* | 11/2016 | Schutz | H01R 13/6273 |
| 2017/0033730 | A1* | 2/2017 | Almy | H02S 20/30 |
| 2017/0063288 | A1* | 3/2017 | Schuit | F24S 25/632 |
| 2017/0063300 | A1* | 3/2017 | Ash | H02S 20/23 |
| 2017/0194902 | A1* | 7/2017 | Meine | F24S 25/61 |
| 2017/0302221 | A1* | 10/2017 | Jasmin | H02S 30/10 |
| 2017/0366131 | A1* | 12/2017 | Stearns | F24S 25/634 |
| 2018/0131314 | A1* | 5/2018 | Stearns | H02S 20/24 |
| 2018/0135891 | A1* | 5/2018 | Li | F24S 25/636 |
| 2018/0238359 | A1* | 8/2018 | Cross | F41C 23/04 |
| 2018/0287550 | A1* | 10/2018 | McPheeters | H02S 20/30 |
| 2018/0294764 | A1* | 10/2018 | Stearns | H02S 20/24 |
| 2018/0342974 | A1* | 11/2018 | Jasmin | F24S 25/636 |
| 2019/0013772 | A1* | 1/2019 | Bamat | F16B 2/12 |
| 2019/0049151 | A1* | 2/2019 | Harris | F24S 25/636 |
| 2019/0178274 | A1* | 6/2019 | Katz | F24S 25/65 |
| 2019/0273460 | A1* | 9/2019 | Kovacs | F24S 25/35 |
| 2019/0296689 | A1* | 9/2019 | Haddock | F16B 5/0685 |
| 2019/0326847 | A1* | 10/2019 | Zuritis | F16B 5/0685 |
| 2019/0372515 | A1* | 12/2019 | Olson | F16B 5/0621 |
| 2021/0156135 | A1* | 5/2021 | Stephan | F16B 7/187 |
| 2021/0156413 | A1* | 5/2021 | Stephan | F24S 25/636 |
| 2025/0297704 | A1* | 9/2025 | Komuravelly | F16M 13/022 |

OTHER PUBLICATIONS

United States Patent and Trademark Office, Office Action received for U.S. Appl. No. 16/215,266, dated Sep. 3, 2020, 9 pages, U.S.

U.S. Appl. No. 16/117,813, "Solar Panel Mounting Configuration", Unpublished (filing date Aug. 30, 2018), (David Katz, Inventor) (Tamarack Solar Products, Inc., assignee).

United States Patent and Trademark Office, Office Action received for U.S. Appl. No. 16/215,266, dated Sep. 2, 2021, 8 pages, U.S.

United States Patent and Trademark Office, Office Action received for U.S. Appl. No. 17/226,895, dated Sep. 14, 2021, 18 pages, U.S.

* cited by examiner

SOLAR PANEL MOUNTING CONFIGURATION

CROSS-REFERENCE TO RELATED APPLICATIONS

This patent application is a continuation of U.S. patent application Ser. No. 17/806,692, filed Jun. 13, 2022, which is a continuation of U.S. patent application Ser. No. 16/215,266, filed Dec. 10, 2018, now U.S. Pat. No. 11,384,780, which claims priority from U.S. Provisional Appl. Ser. No. 62/598,249 filed Dec. 13, 2017 and U.S. Provisional Appl. Ser. No. 62/660,438, filed Apr. 20, 2018, each of which is incorporated herein by reference in its entirety.

BACKGROUND

Solar panels, which typically comprise large sheets of glass surrounded by a rigid frame (e.g., aluminum) and two electrical leads extending from each panel that are electrically connected to an electrical storage device (e.g., a battery or inverter). Due to the very nature of solar panels and the mechanism through which they generate electricity, solar panels are often secured to building roofs or other supportive structures where the solar panels are exposed to direct sunlight for a maximum amount of time during each day.

As solar energy becomes an increasingly popular source of electrical power both on and off traditional power grids, the need for installation systems that can be quickly and easily utilized to secure solar panels to respective supportive structures has become increasingly important.

BRIEF SUMMARY

Various embodiments are directed to a mounting clamp for mounting a solar panel onto a mounting rail. In certain embodiments, the mounting clamp comprises: a clamp component configured to frictionally engage a top surface of a solar panel; a channel nut configured to engage an interior portion of the mounting rail; and a fastening member adjustably securing the clamp component relative to the channel nut and configured to, when tightened, pull the clamp component toward the channel nut and the mounting rail to clamp the solar panel against an exterior portion of the mounting rail.

In various embodiments, the clamp component comprises: a vertical body portion aligned parallel with the fastening member, a top horizontal leg extending from an upper end of the vertical body portion, wherein the top horizontal leg is configured to engage the top surface of the solar panel; and a bottom horizontal leg extending from a lower end of the vertical body portion, wherein the bottom horizontal leg is configured to engage a side surface of the solar panel, wherein the side surface is perpendicular to the top surface. Moreover, the fastening member may extend through an aperture in the top horizontal leg and a slot in the bottom horizontal leg. In certain embodiments, the top horizontal leg has a length longer than the bottom horizontal leg. In various embodiments, the solar panel is a first solar panel of a plurality of solar panels, and the clamp component defines opposite horizontal clamp surfaces, wherein a first horizontal clamp surface is configured to engage the first solar panel and a second horizontal clamp surface is configured to engage a second solar panel; and wherein the mounting clamp further comprises a compressible resilient member configured to support the clamp component a distance away from the channel nut. In certain embodiments, the compressible resilient member defines interference fit components to engage corresponding features of the clamp component.

In various embodiments, the solar panel is a first solar panel of a plurality of solar panels, and wherein the clamp component comprises: a vertical body portion aligned parallel with the fastening member, a first top horizontal leg extending from an upper end of the vertical body portion in a first direction, wherein the first top horizontal leg is configured to engage the top surface of the first solar panel; a second top horizontal leg extending from the upper end of the vertical body portion in a second direction, opposite the first direction, wherein the second top horizontal leg is configured to engage the top surface of a second solar panel; and a bottom horizontal leg extending from a lower end of the vertical body portion, wherein the bottom horizontal leg is configured to engage a side surface of the solar panel, wherein the side surface is perpendicular to the top surface. In certain embodiments, the fastening member extends through an aperture in the first top horizontal leg and a slot in the bottom horizontal leg. Moreover, in certain embodiments, the first top horizontal leg is longer than the second top horizontal leg. In various embodiments, the first top horizontal leg is longer than the bottom horizontal leg. In certain embodiments, the mounting clamp further comprises a compressible resilient member configured to support the clamp component a distance away from the channel nut.

Certain embodiments are directed to a mounting clamp for mounting a solar panel onto a mounting rail. In various embodiments, the mounting clamp comprising: a top engagement feature configured to engage a frame portion of a solar panel; a bottom engagement feature pivotably secured relative to the top engagement feature and configured to engage an interior portion of the mounting rail; and a tightening element configured to, when tightened, cause the bottom engagement feature to pivot relative to the top engagement feature and to close a gap between a portion of the top engagement feature and a portion of the bottom engagement feature to clamp the frame portion of the solar panel against an exterior portion of the mounting rail.

In various embodiments, the tightening element is a bolt rotatable about a bolt axis, and wherein tightening the bolt causes the gap to close in a direction perpendicular to the bolt axis. Moreover, the bolt may loosely extend through the bottom engagement feature and thread into the top engagement feature. In certain embodiments, the bottom engagement feature is pivotably secured relative to the top engagement feature about a pivot axis perpendicular to the bolt axis. Moreover, the mounting clamp may further comprise a pivot pin, and wherein the top engagement feature and the bottom engagement feature are secured relative to the pivot pin.

BRIEF DESCRIPTION OF THE SEVERAL VIEWS OF THE DRAWINGS

Reference will now be made to the accompanying drawings, which are not necessarily drawn to scale, and wherein.

DETAILED DESCRIPTION

Figure 1:
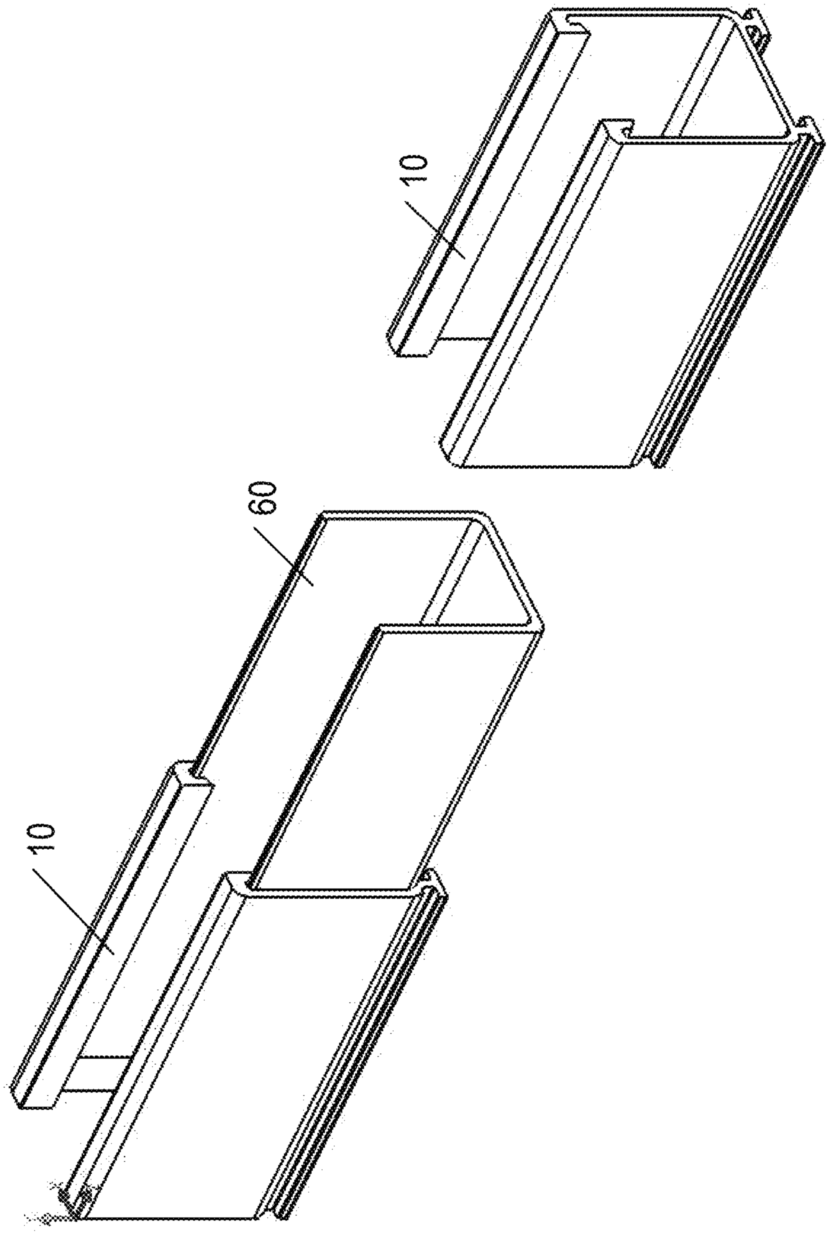
FIG. 1 is a perspective view of an internal rail splice utilized to join two rails according to one embodiment.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

It should be understood that the terms of direction provided within this disclosure are provided merely for purposes of convenience relative to the orientation of the configurations shown in the attached figures. Accordingly, while the terms "vertical" and "horizontal" are provided in reference to the orientation of the various configurations shown in the figures, it should be understood that these directions are provided merely to case the discussion of the functionality of the described configurations, however it should be understood that the described configurations may be provided in any orientation. Indeed, the described solar panel mounting configurations may be utilized to mount solar panels relative to supportive structures configured at any angle relative to horizontal. For example, the described configurations may be secured relative to entirely horizontal building roofs, pitched building roofs between 0-90 degrees, or entirely vertical building walls, as non-limiting examples.

Various embodiments are directed to rail-based mounting systems for securing solar panels relative to supportive structures (e.g., roofs). As shown in the attached figures, rails 10 may be utilized to secure solar panels to a support surface. The rails 10 may be aluminum extruded rails having a mill finish (e.g., no coating), an anodized finish, a painted finish, and/or the like. In certain embodiments, the rails 10, various components of the mounting mechanism, and/or the rail splices discussed herein may comprise an electrically conductive material that may be used to connect the components relative to electrical ground. However it should be understood that any of a variety of materials may be utilized, including, for example, stainless steel, carbon steel, titanium, and/or the like. Moreover, the rails may be formed by any of a variety of manufacturing mechanisms, such as extrusion, forging, casting, milling, and/or the like.

Rails 10 may be spliced together to provide additional length to a particular rail mounting portion (e.g., to accommodate a large number of solar panels arranged in a single line). Rail splicing (e.g., securing multiple rails 10 relative to one another in an end-to-end configuration) may be provided via rail splice members configured to be secured relative to a plurality of rails 10. The rail splices may be configured of aluminum or another electrically conductive material having sufficient structural support to secure multiple rails 10 relative to one another.

The rail splice may be embodied as an internal rail splice 60 as shown in FIG. 1. The internal rail splice 60 may be configured to engage corresponding mounting features (e.g., mounting features positioned at a top portion of the rail 10, in a sidewall of the rail 10, and/or the like). Accordingly, in certain embodiments the internal rail splices 60 may be configured for use with a specific size (e.g., height) rail 10, as shown in the attached figures. In various embodiments, internal rail splices 60 having sidewall heights corresponding to specific rail sizes may more naturally match the rail strength. Moreover, the internal rail splice 60 does not extend to the exterior of the attached rails 10, and accordingly the internal rail splices 60 do not interfere with the described features for securing a rail relative to a mounting mechanism.

In certain embodiments, the sidewalls of the internal rail splices 60 may be biased (preloaded) away from an interior of the rail splice, such that the sidewalls impart a compressive force onto rails 10 when inserted therein. To install the preloaded internal rail splice 60 within the rail 10, an installer may flex the sidewalls of the internal rail splice 60 toward the interior of the rail splice and may insert the internal rail splice 60 within the interior of the rail 10. Once the internal rail splice 60 is inserted into the rail 10, the preloaded sidewalls expand outward, thereby providing a compressive force on the rails 10. The compressive force may create a stronger frictional bond between the internal rail splice 60 and the rails 10 to securely mount the multiple rails 10 relative to one another.

Figure 2:
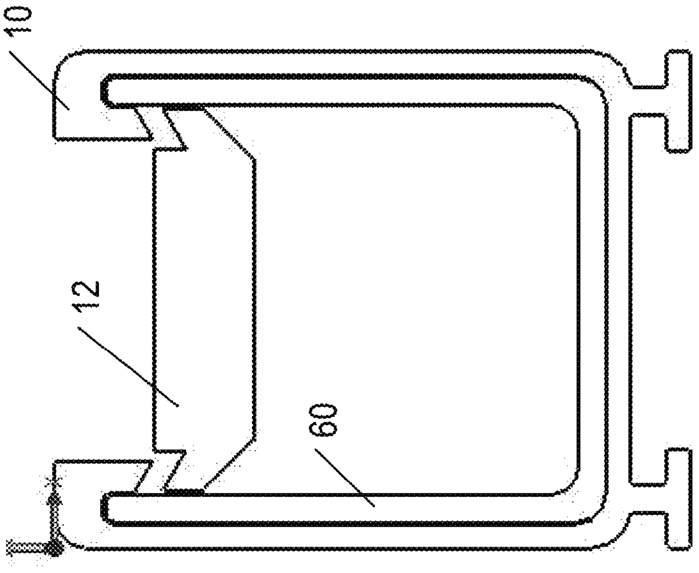
FIG. 2 is an end-on view of an internal rail splice within a rail according to one embodiment.

Because the internal rail splices 60 are located within the interior portion of the rails 10, the internal rail splices 60 may be utilized with a plurality of different rail configurations having one or more different rail profiles (e.g., corresponding to different engagement features 11 as discussed herein). Moreover, because the internal rail splices 60 are located within the interior portion of the rails 10, specially configured channel nuts 12 (as shown in FIG. 2) may be provided to be secured relative to the rails 10 at a location adjacent the internal rail splices 60.

Figure 3:
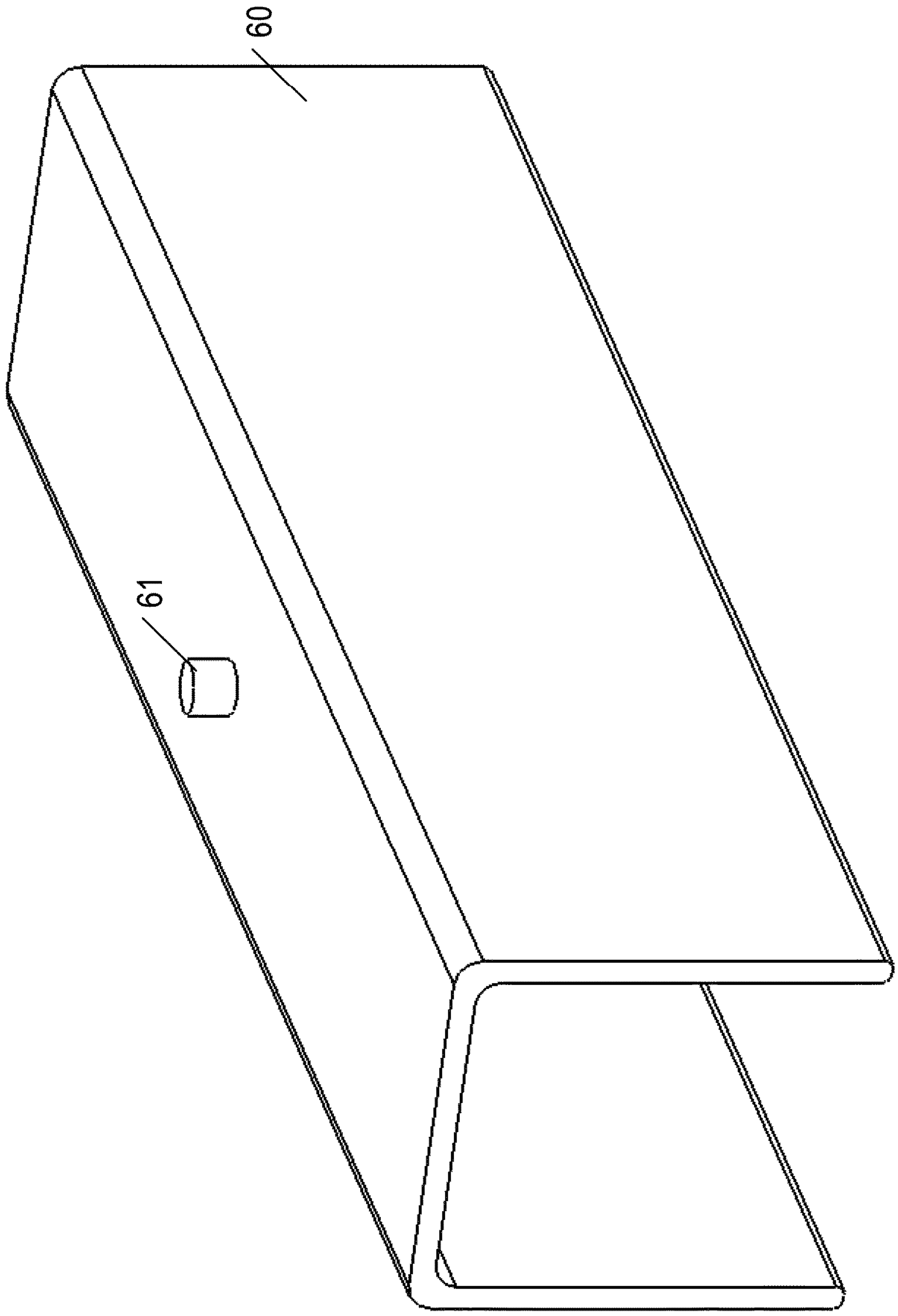
FIG. 3 is an inverted perspective view of a rail splice having a key feature according to one embodiment.
Figure 4A:
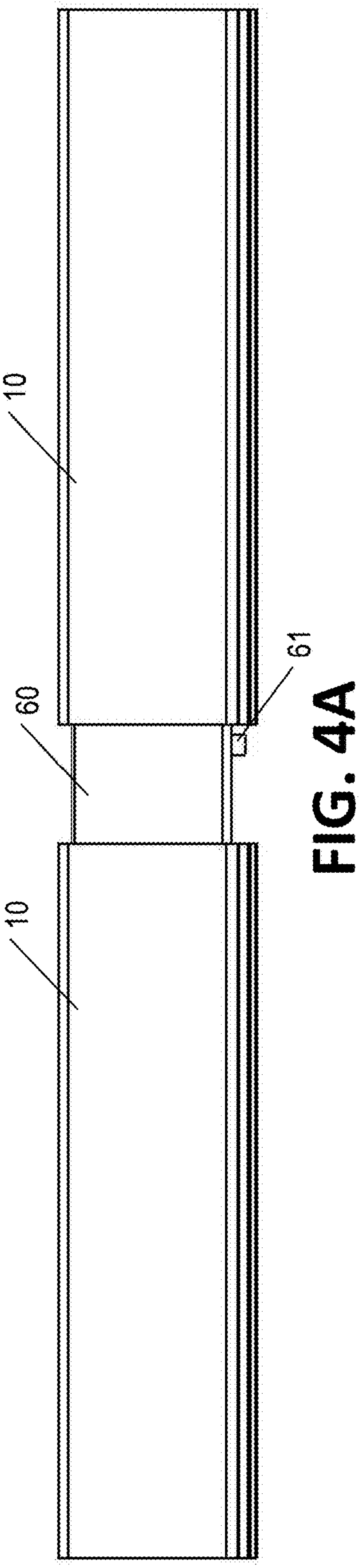
FIGS. 4A-4B are side views of rails being assembled relative to an internal rail splice having a key feature according to one embodiment.
Figure 4B:
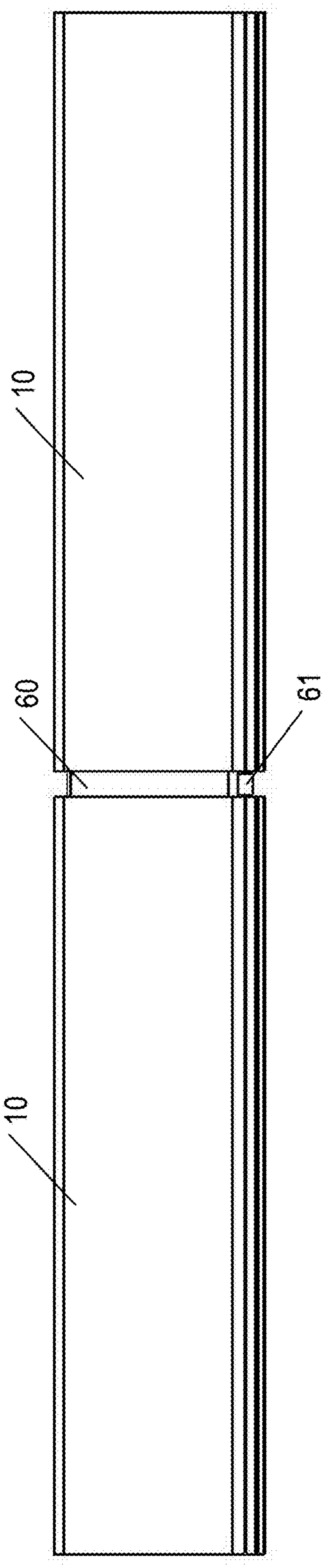

In certain embodiments, the internal rail splices 60 may comprise a key feature 61 on an exterior surface of the internal rail splice 60 (as shown in FIG. 3). The key feature 61 may be positioned at least substantially centrally along the length of the internal rail splice 60, such that the key feature 61 facilitates centering of the internal rail splice 60 relative to a plurality of rails 10. As the rails 10 are pressed onto the internal rail splice 60, the rails 10 are prevented from moving relative to the internal rail splice 60 once a portion of the rail 10 contacts the key feature 61. Thus, rails 10 may be pressed onto the internal rail splice 60 (as shown in FIGS. 4A-4B) until each rail 10 contacts the key feature 61 to center the internal rail splice 60 relative to the rails 10. In certain embodiments, the key feature 61 may be integrally formed with the internal rail splice 60 (e.g., the thickness of the rail splice may be milled around the key feature 61; the internal rail splice 60 may be forged with an integrated key feature 61; the key feature 61 may be punched into the internal rail splice 60; and/or the like) or the key feature 61 may be secured relative to the internal rail splice 60.

Although described in relation to internal rail splices 60, it should be understood that the key feature 61 may be integrated into an external rail splice by placing the key feature 61 on an interior surface of the external rail splice 60, such that rails 10 contact the key feature 61 as they are pressed onto the rail splice.

End Clamp

Certain embodiments are directed to clamps configured to be implemented with rails 10 according to various embodiments, to secure components (e.g., solar panels) relative to the rails 10.

Figure 5:
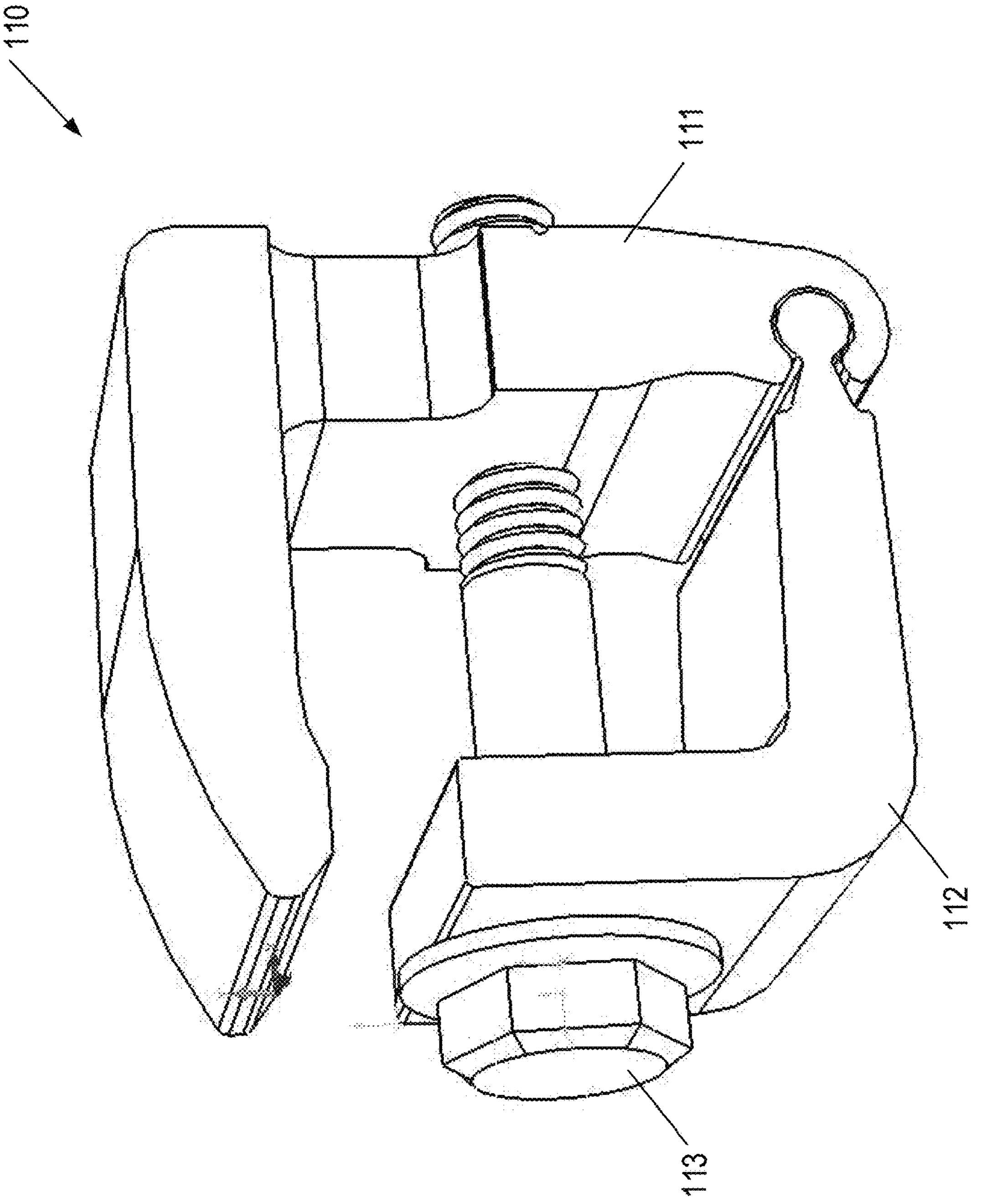
FIG. 5 is a perspective view of an end clamp according to one embodiment.

FIG. 5 illustrates an end clamp 110 configured to secure a module 200 relative to an end of a rail 10. The unique shape of the end clamp 110 allows it to be slid into the rail 10, with a tightening element 113 (e.g., a bolt) set inside the rail 10 and accessible from the end of the rail 10 to tighten the end clamp 110 and secure modules 200 relative to the rail 10. In certain embodiments, components of the end clamp 110 may be made by a low cost extrusion, casting, forging, or molding process. The clamping force is created by the component closest to the bolt head, which is under flanges defining the rail channel, and the portion of the clamp directly above it.

Figure 6:
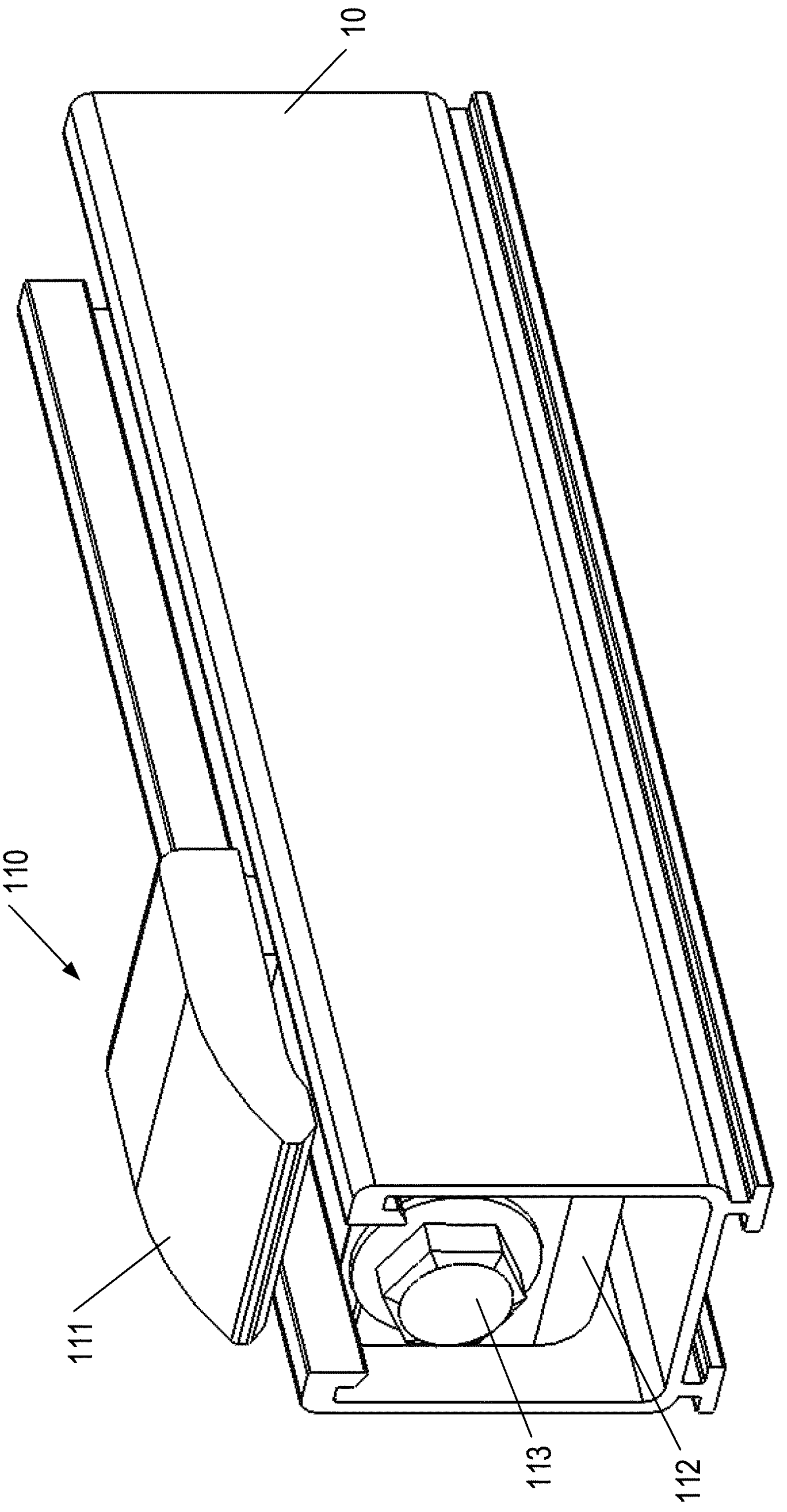
FIG. 6 is a perspective view of an end clamp within a rail according to one embodiment.
Figure 7:
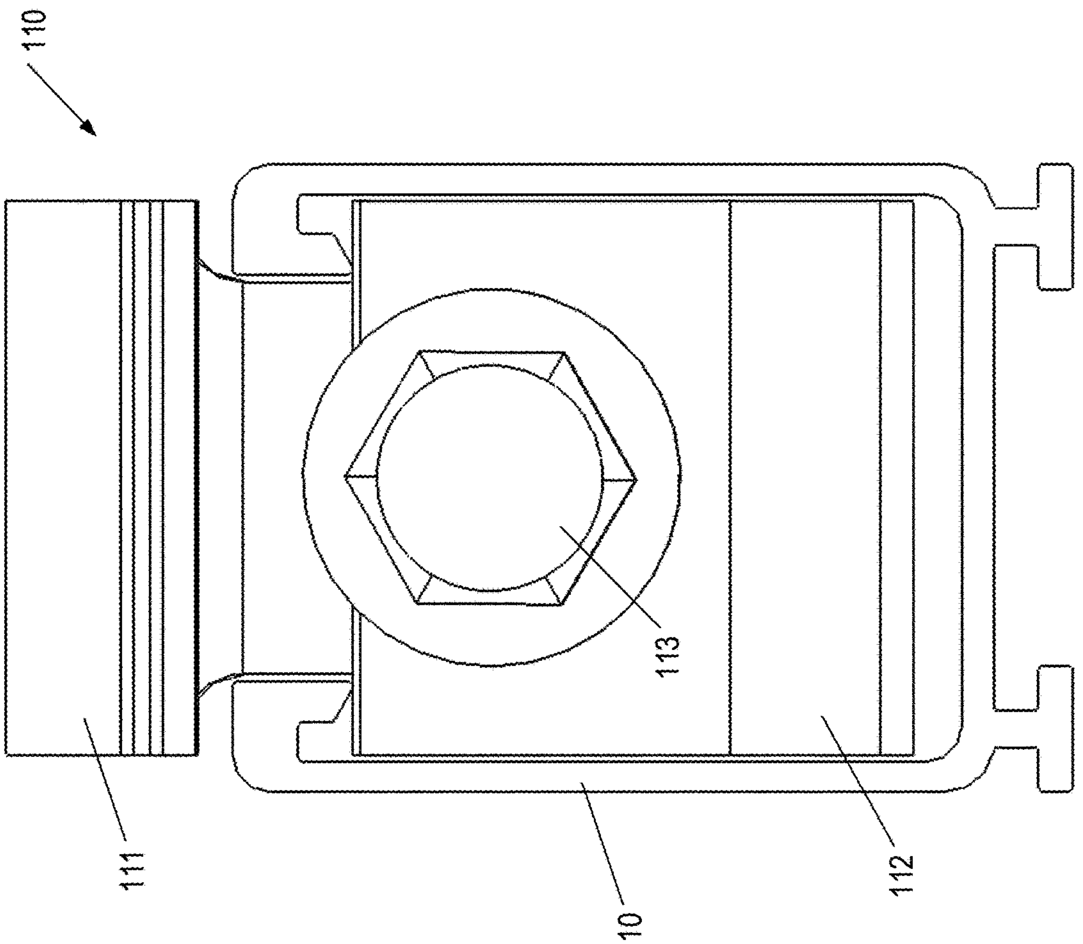
FIG. 7 is an end view of an end clamp within a rail according to one embodiment.

In the illustrated embodiment, the end clamp 110 comprises a top engagement component 111, a bottom engagement component 112, and a tightening element securing the top engagement component 111 and bottom engagement component 112. As shown, the top engagement component 111 comprises a wide bottom portion defining shoulders configured to engage a bottom surface of flanges defining a rail channel, and a thin top portion configured to fit within the rail channel (as shown in FIGS. 6-7). The thin top portion extends in a first direction (e.g., in a horizontal direction toward the bottom engagement component 112) configured to engage a portion of a module 200 (e.g., solar panel). Overall, the top engagement component 111 may define an at least substantially inverted "L" shape, with the tightening element 113 extending parallel to a leg of the "L" along a tightening element axis. The bottom engagement component 112 is pivotably secured relative to the top engagement component 111 at a pivot portion and about a pivot axis. The pivot portion may be configured to provide a single degree of freedom (rotational about a single horizontal pivot axis perpendicular to a longitudinal tightening element axis of the tightening element 113). The bottom engagement component 112 may also be at least substantially "L" shaped, and collectively, the top engagement component 111 and bottom engagement component 112 may define an at least substantially rectangular shape, with a first corner defining the pivot portion, and the opposite corner (diagonally across the rectangle) defining clamp jaws that may be tightened (e.g., such that a gap between the clamp jaws may be closed in a direction perpendicular to both the tightening element axis and the pivot axis) to secure a module 200 therein.

Figure 8B:
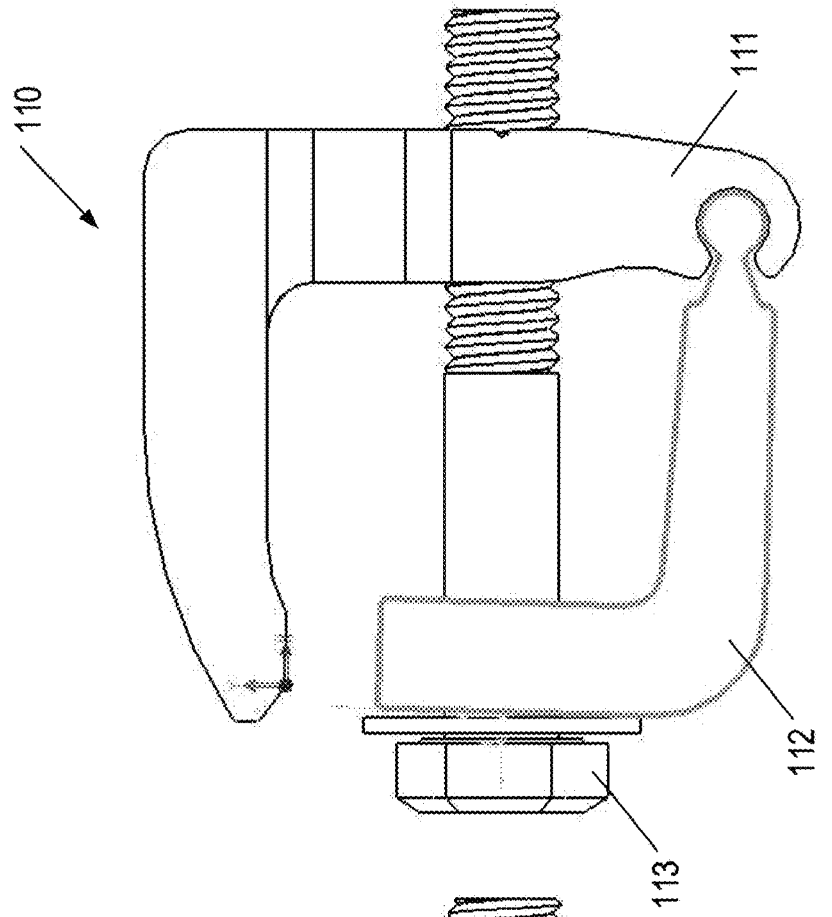
FIGS. 8A-8B are side views of an end clamp in an open and closed configuration, respectively, according to one embodiment.
Figure 8A:
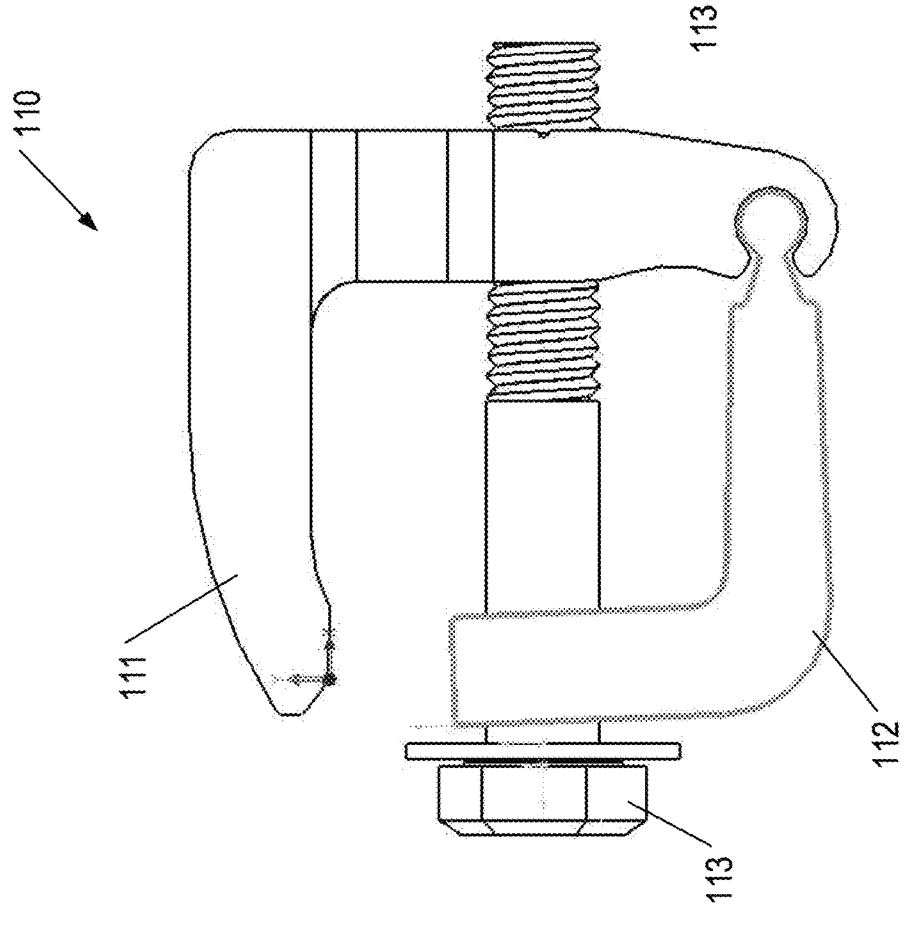
Figure 9A:
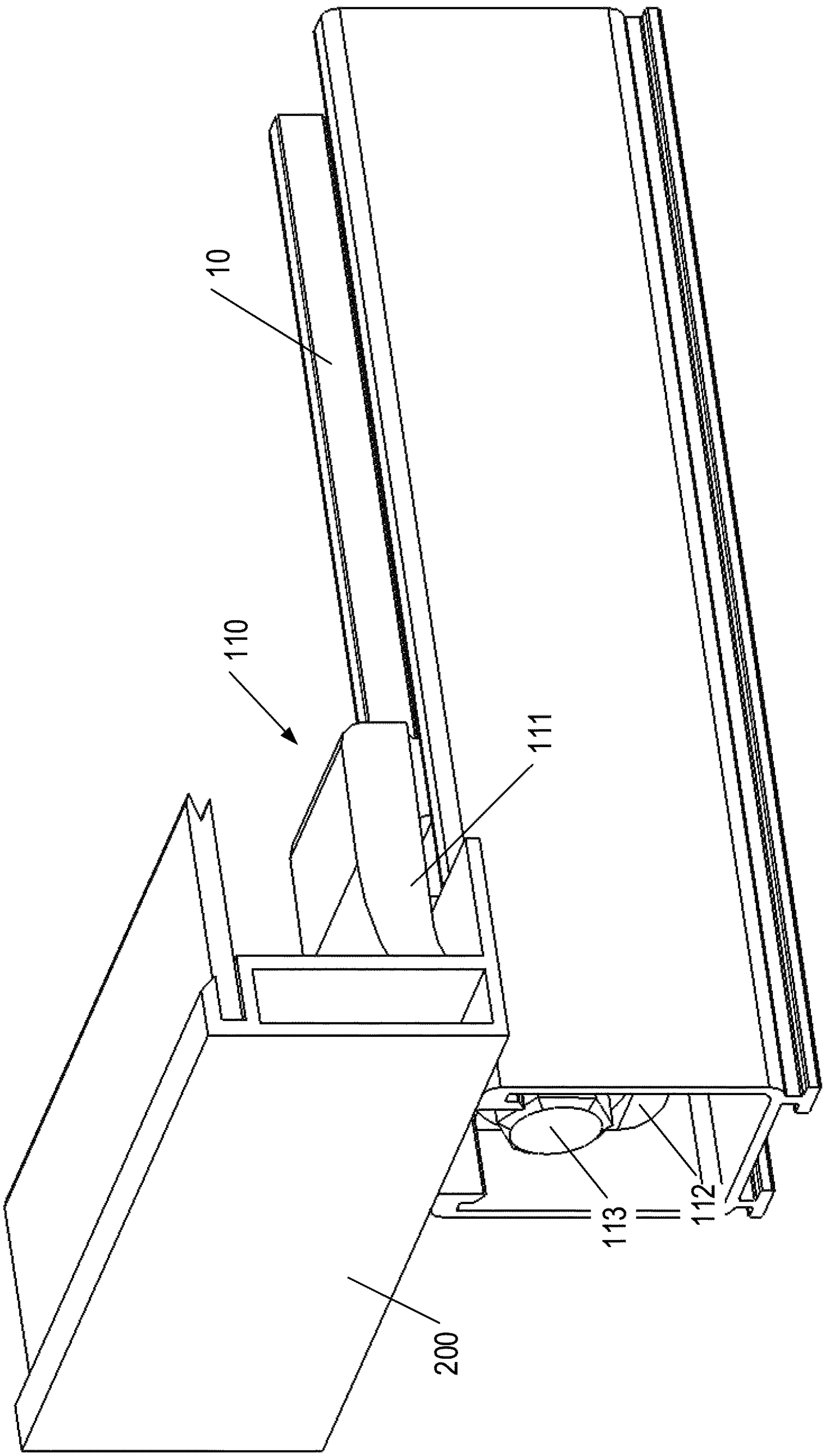
FIGS. 9A-9B are views of an end clamp securing a module relative to a rail according to one embodiment.
Figure 9B:
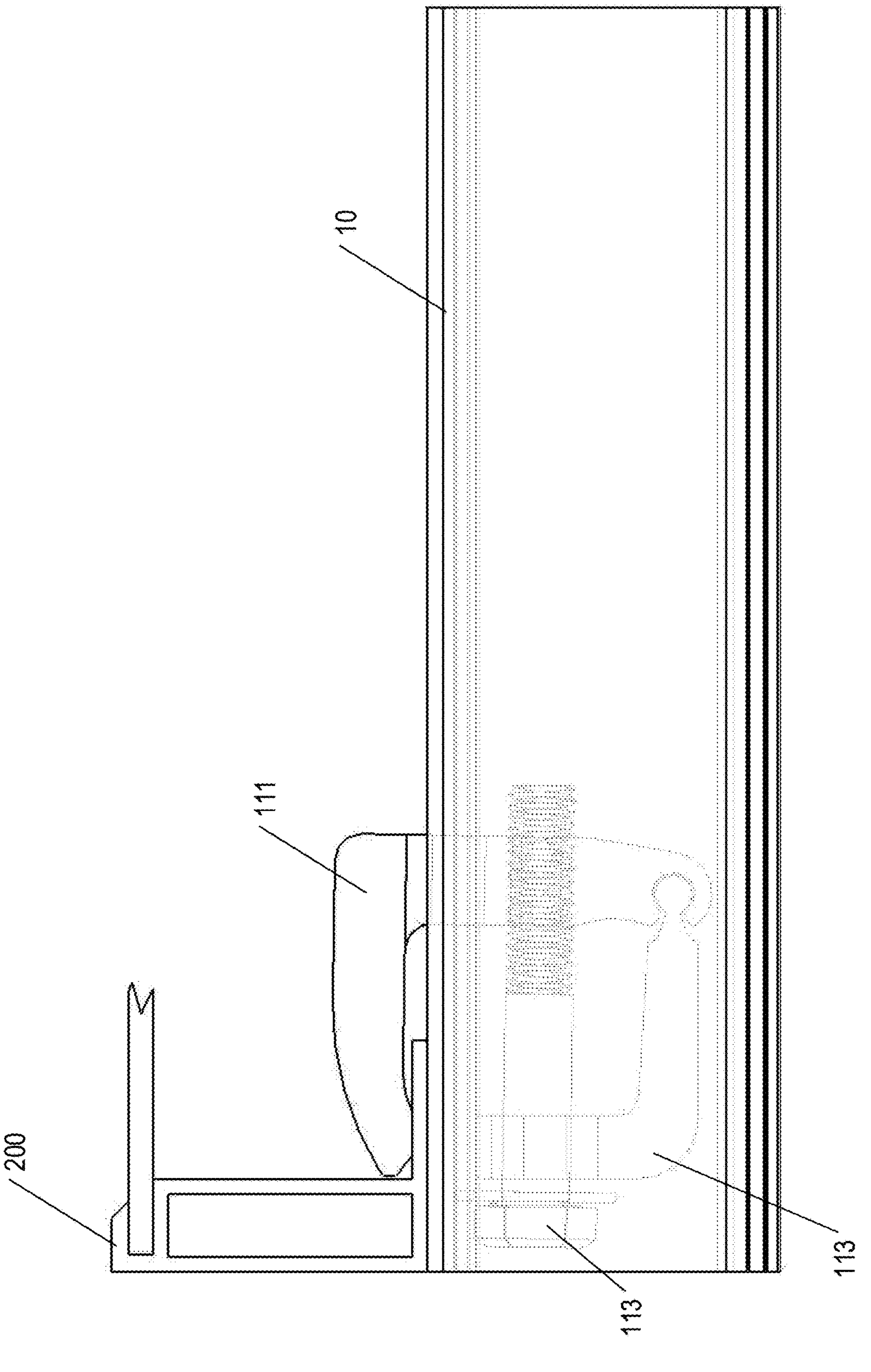
Figure 10B:
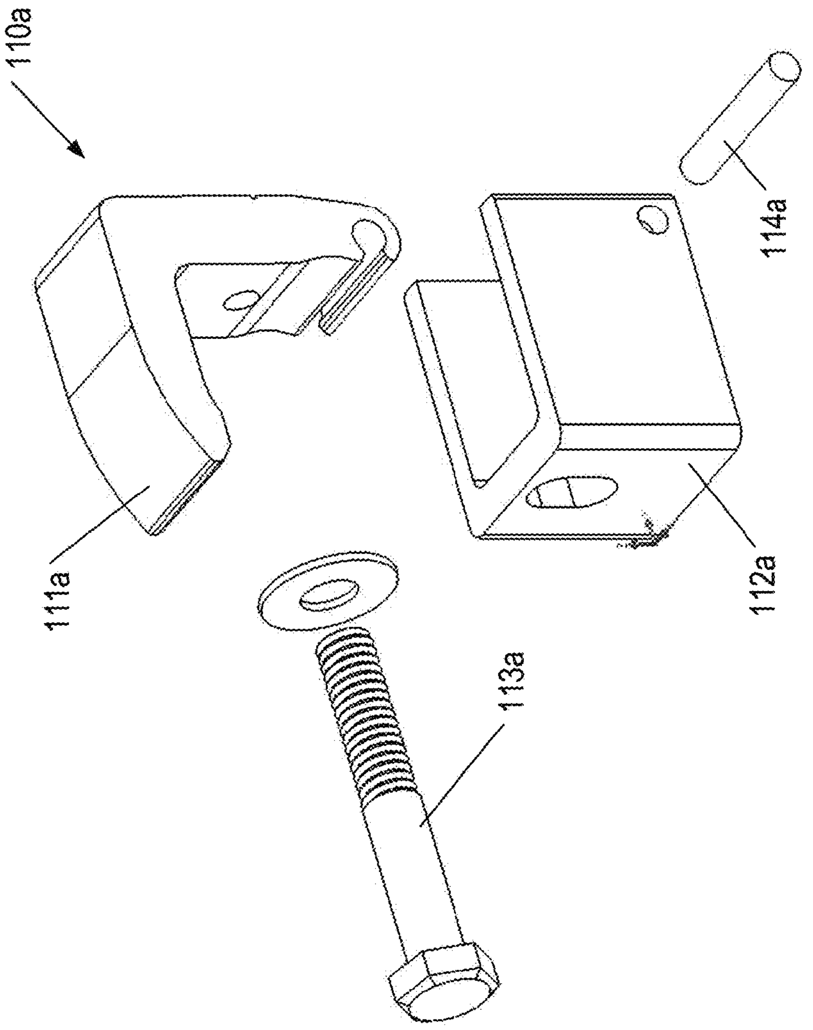
FIGS. 10A-10D are various views of an alternative configuration of an end clamp according to one embodiment.
Figure 10A:
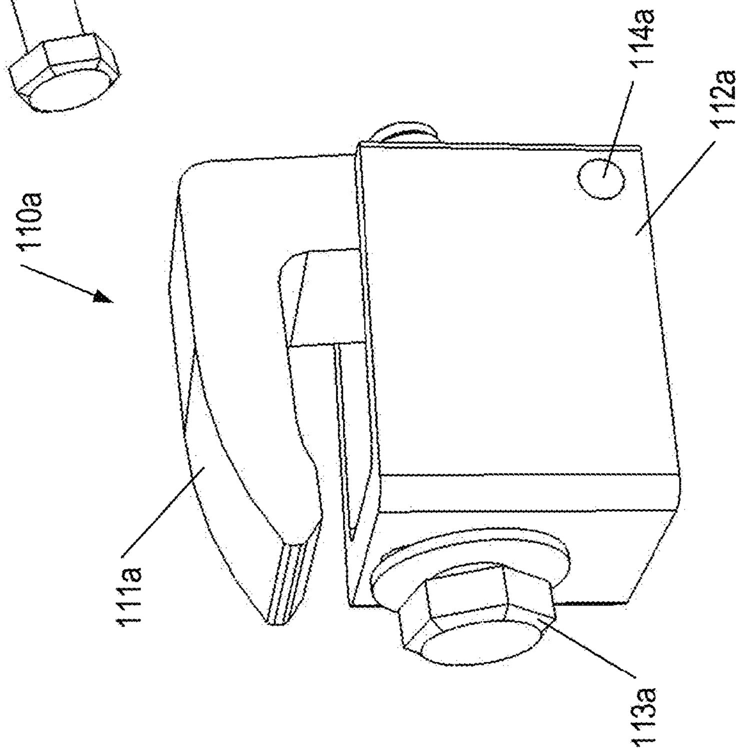
Figure 10D:
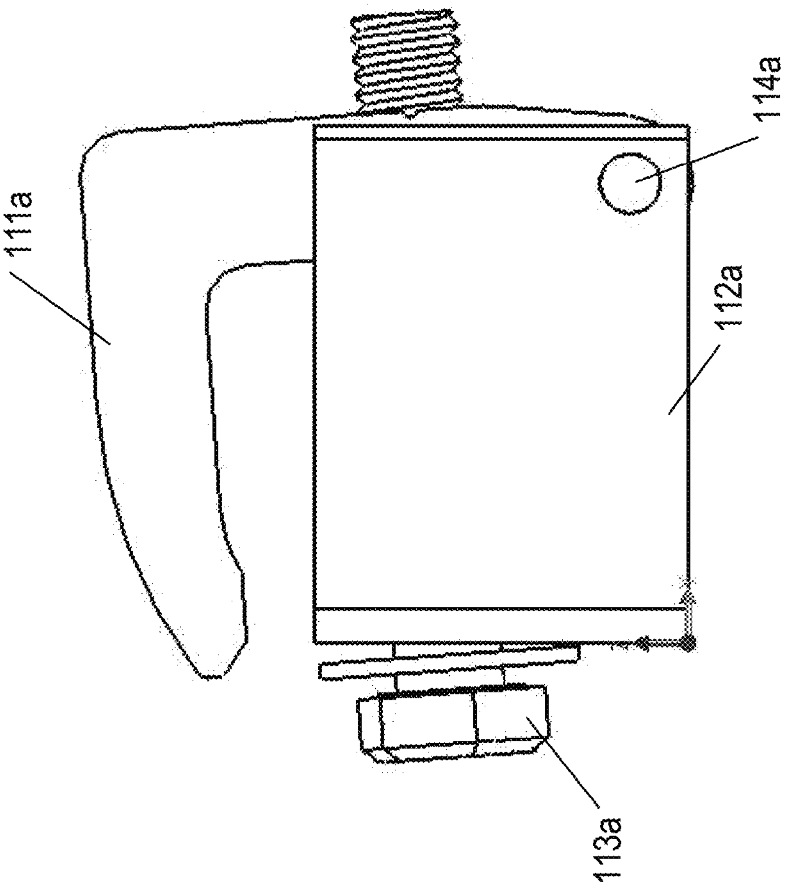
Figure 10C:
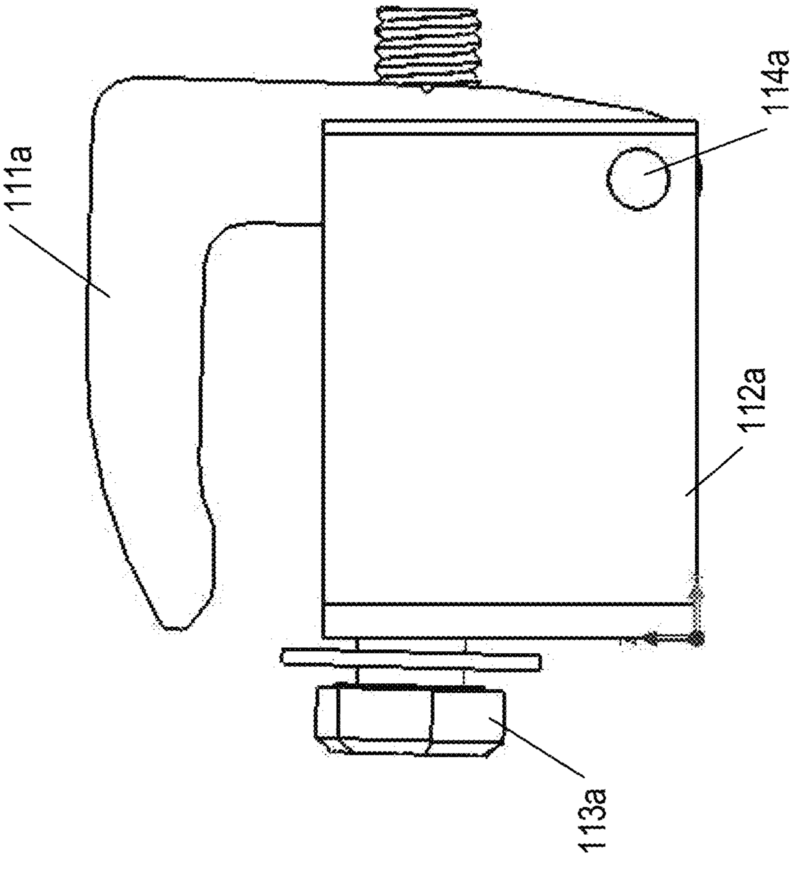

As shown in FIGS. 8A-8B, the tightening element 113 may slidably extend through the bottom engagement component 112, and may be threaded into the top engagement component 111. Accordingly, tightening the tightening element 113 may draw a portion of the bottom engagement component 112 toward the top engagement component 111 (thereby pivoting the bottom engagement component 112 relative to the top engagement component 111 at the pivot portion). The clamp jaws may thereby close (as shown in FIG. 8B) onto a module 200 as shown in FIGS. 9A-9B, and simultaneously, the shoulder portion of the top engagement component 111 may engage the underside of the rail channel to secure the end clamp 110 in place relative to the rail 10.

FIGS. 10A-10D illustrate an alternative embodiment of an end clamp **110*a* according to various embodiments. As shown therein, the bottom engagement component 112*a* may be defined as a channel member that may be inserted within the rail channel. In such embodiments, the bottom engagement component 112*a* engages the flanges of the rail channel to secure the end clamp 110*a* relative to the rail 10, while the top engagement component 111*a* (which may not define the shoulder portions) pivots relative to a pivot point (e.g., a separate pin 114*a*, a pin integrally formed within the bottom engagement component 112*a*, and/or the like) to close the clamp jaws of the end clamp 110*a*. As shown specifically in FIGS. 10C-10D, the clamp jaws operate in a manner as described above in relation to FIGS. 8A-8B**.

Outer End Clamp

Figure 11B:
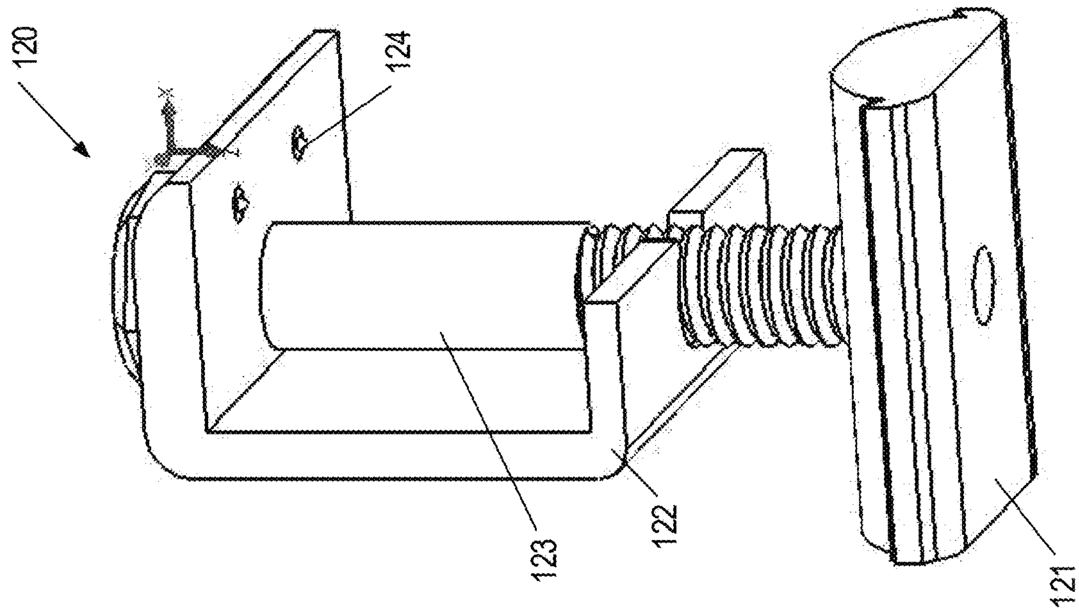
FIGS. 11A-11B are perspective views of an outer end clamp according to one embodiment.
Figure 11A:
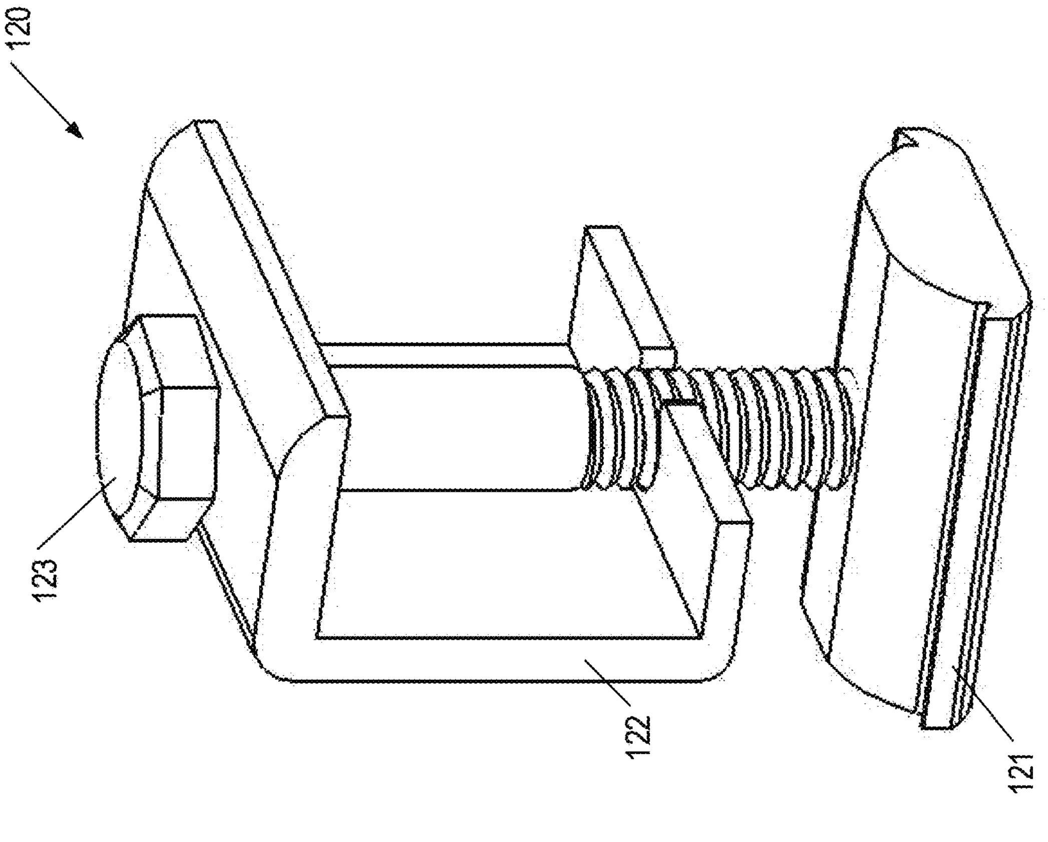
Figure 12:
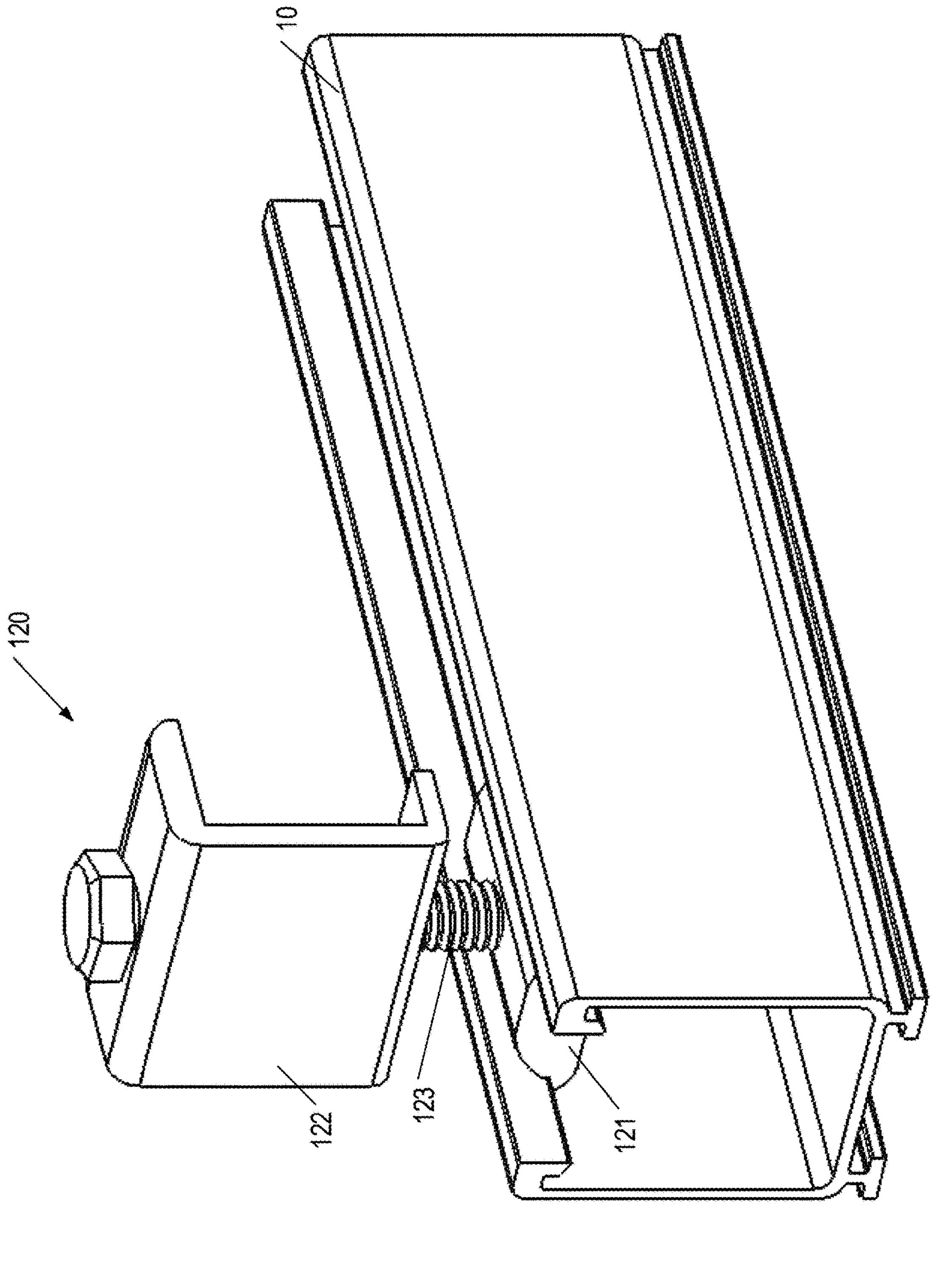
FIG. 12 is a perspective view of an outer end clamp within a rail according to one embodiment.

FIGS. 11A-11B and 12 illustrate an outer end clamp 120 according to various embodiments. The outer end clamp 120 provides an upward facing fastening member 123 that may provide for quicker and/or easier installation. The illustrated outer end clamp 120 is configured to fit a range of module frame sizes, since there are no established standards for module frames.

The outer end clamp 120 shown in FIGS. 11A-11B and 12 comprises a channel nut 121 configured to engage a bottom surface of flanges of a rail channel, a clamp component 122, and a fastening member 123. The fastening member 123 is slidably engaged with the clamp component 122 and is threaded into a threaded aperture of the channel nut 121. As shown, the channel nut 121 height is configured such that it does not extend beyond the top surface of a rail 10 in which it is secured, such that tightening the fastening member 123 to secure a module 200 relative to the rail 10 causes the clamp component 122 to clamp the module 200 relative to the top surface of the rail 10.

Figures 13A, 13B:
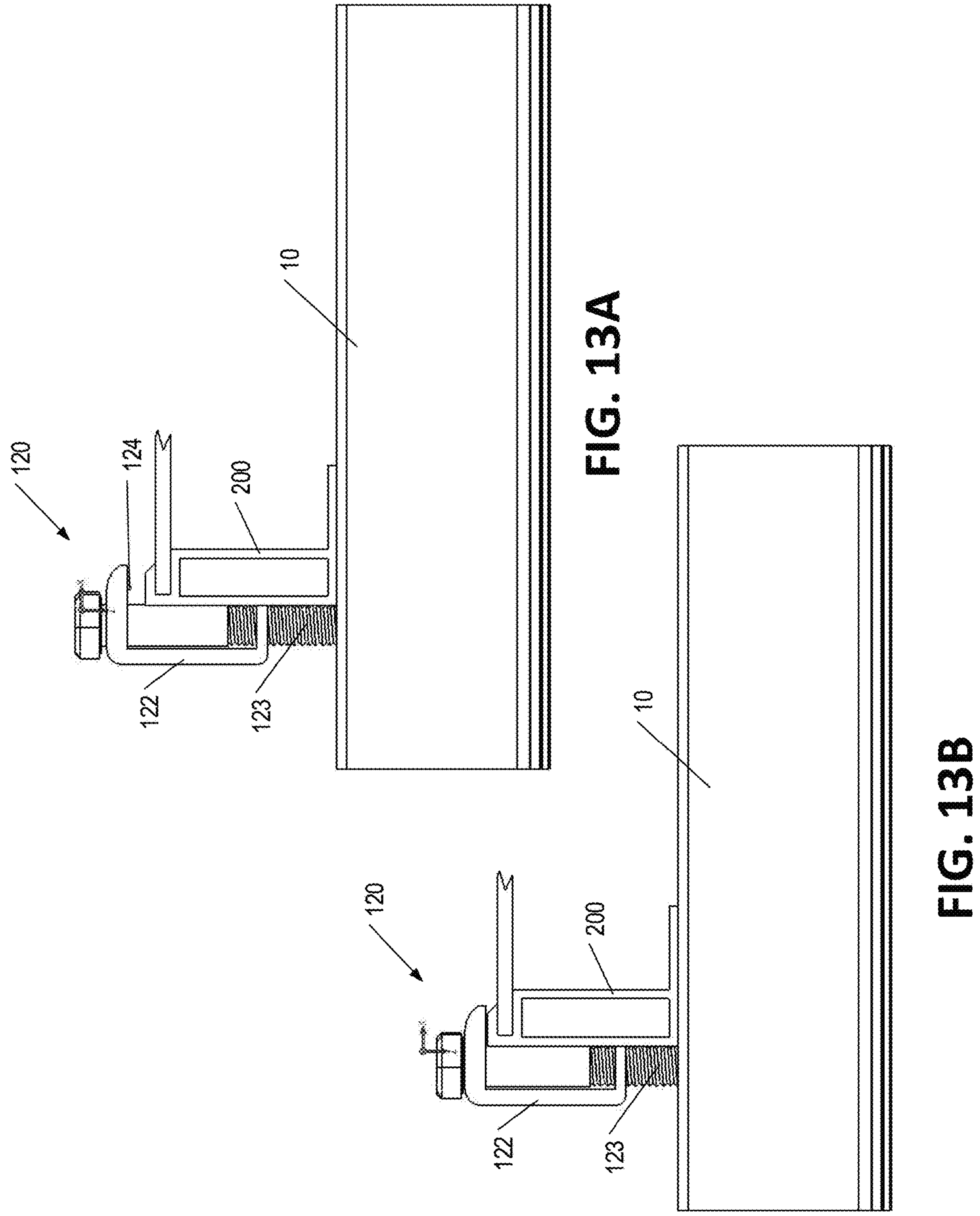
FIGS. 13A-13B are side views of an outer end clamp securing a module relative to a rail according to one embodiment.
Figure 14B:
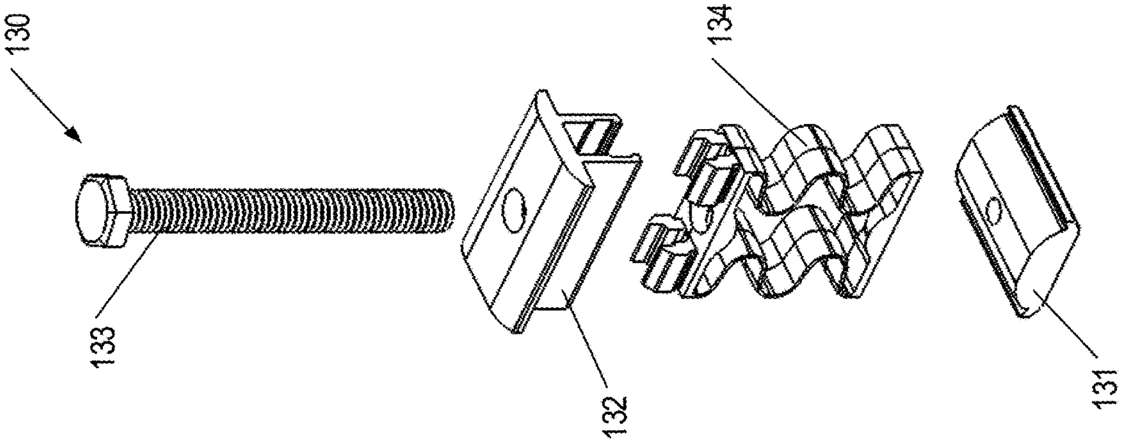
FIGS. 14A-14D are various views of a mid-clamp according to one embodiment.
Figure 14A:
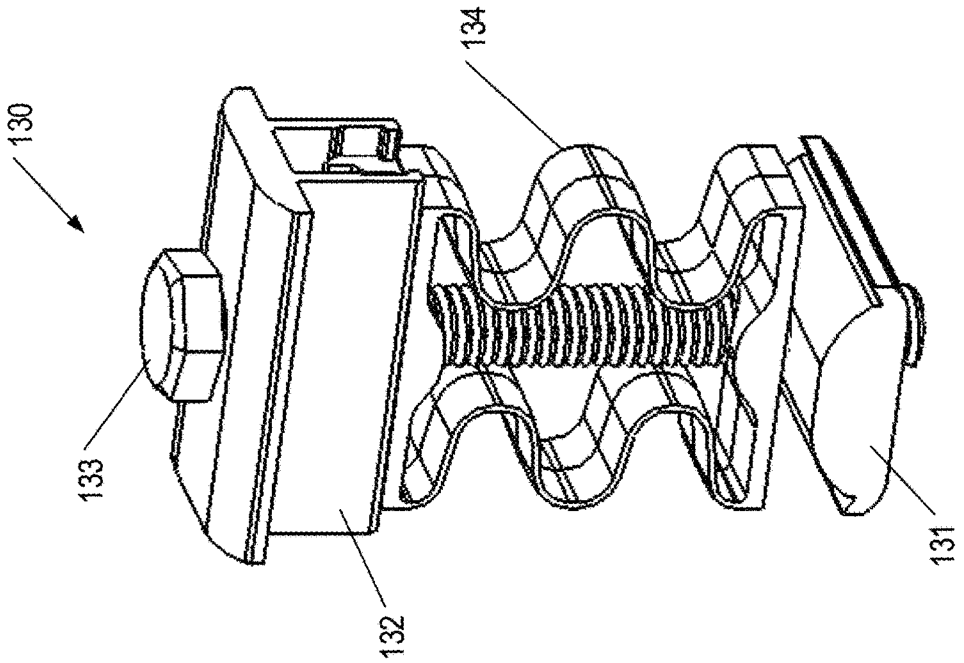
Figure 14D:
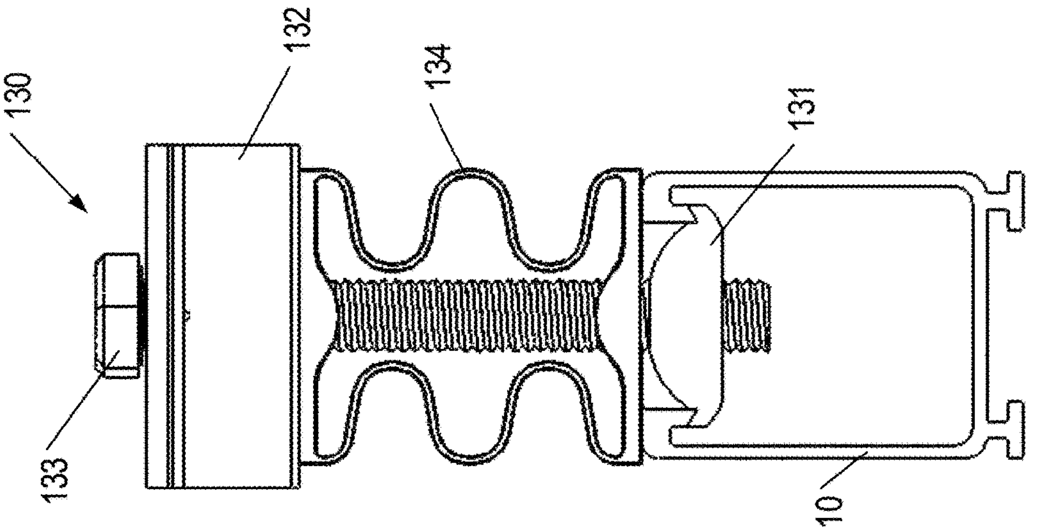
Figure 14C:
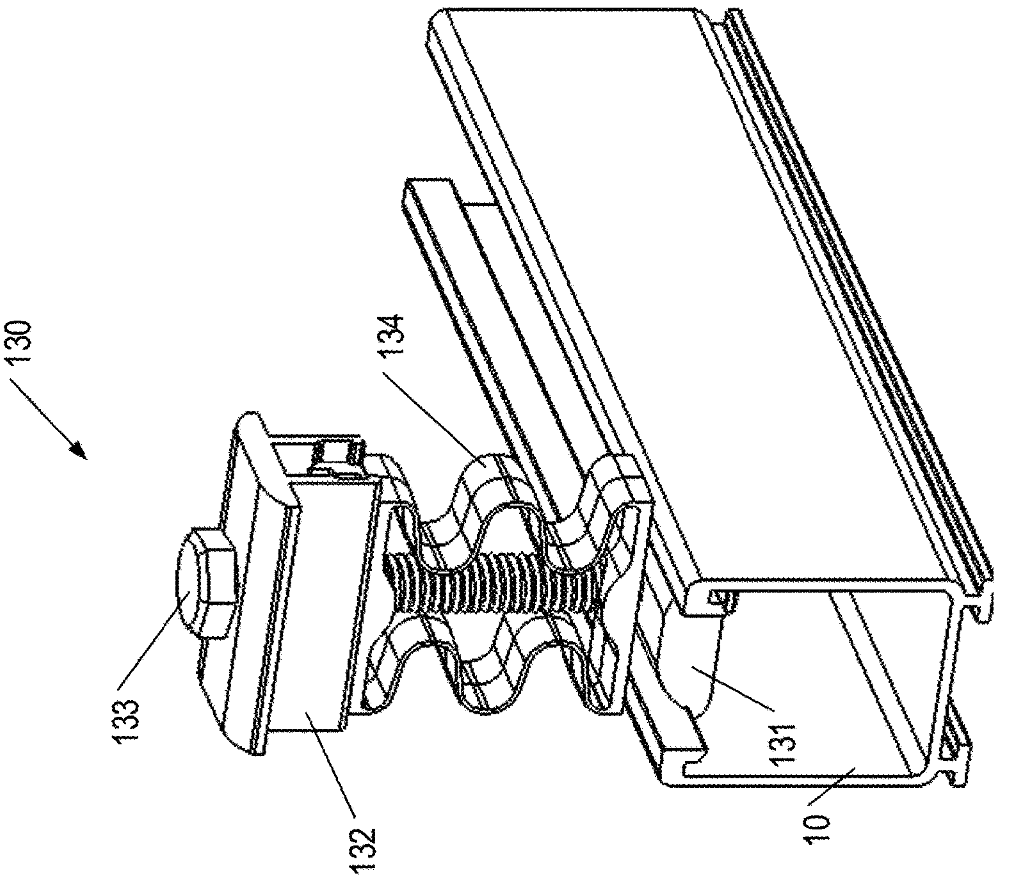

As shown in FIGS. 11A-11B and 12, the clamp component 122 defines an at least substantially "C" shape, having a horizontal top leg having a first length, a vertical body portion, and a horizontal bottom leg having a second length shorter than the first length. The top leg has an aperture therein aligned with a slot within the bottom leg for the fastening member 123 to extend therethrough (e.g., at least substantially parallel to the vertical body portion). The top leg is configured to engage a horizontal surface of a module 200 (e.g., solar panel) pressed against the bottom leg, such that the module 200 is clamped against the top surface of the rail 10 as the fastening member 123 is tightened as shown in FIGS. 13A-13B. As shown in FIGS. 13A-13B, the fastening member 123 may be placed close to the module frame (e.g., in contact with the module frame) to impede rotation of the clamp component 122 relative to the module 200.

Moreover, as shown in FIG. 11B, the bottom surface of the top leg defines one or more puncture elements 124 (e.g., sharp pins) configured to puncture and/or dent the surface of the module 200 as the fastening element 123 is tightened to impede sliding and or rotation of the module 200 relative to the outer end clamp 120. The puncture elements 124 may also serve to provide a reliable electrical connection between the module frame and the rail 10. These puncture elements 124 may be integrally formed with the clamp component 122, may be formed by punching or securing pins relative to the clamp component 122, and/or the like.

Mid-Clamp

Figure 15:
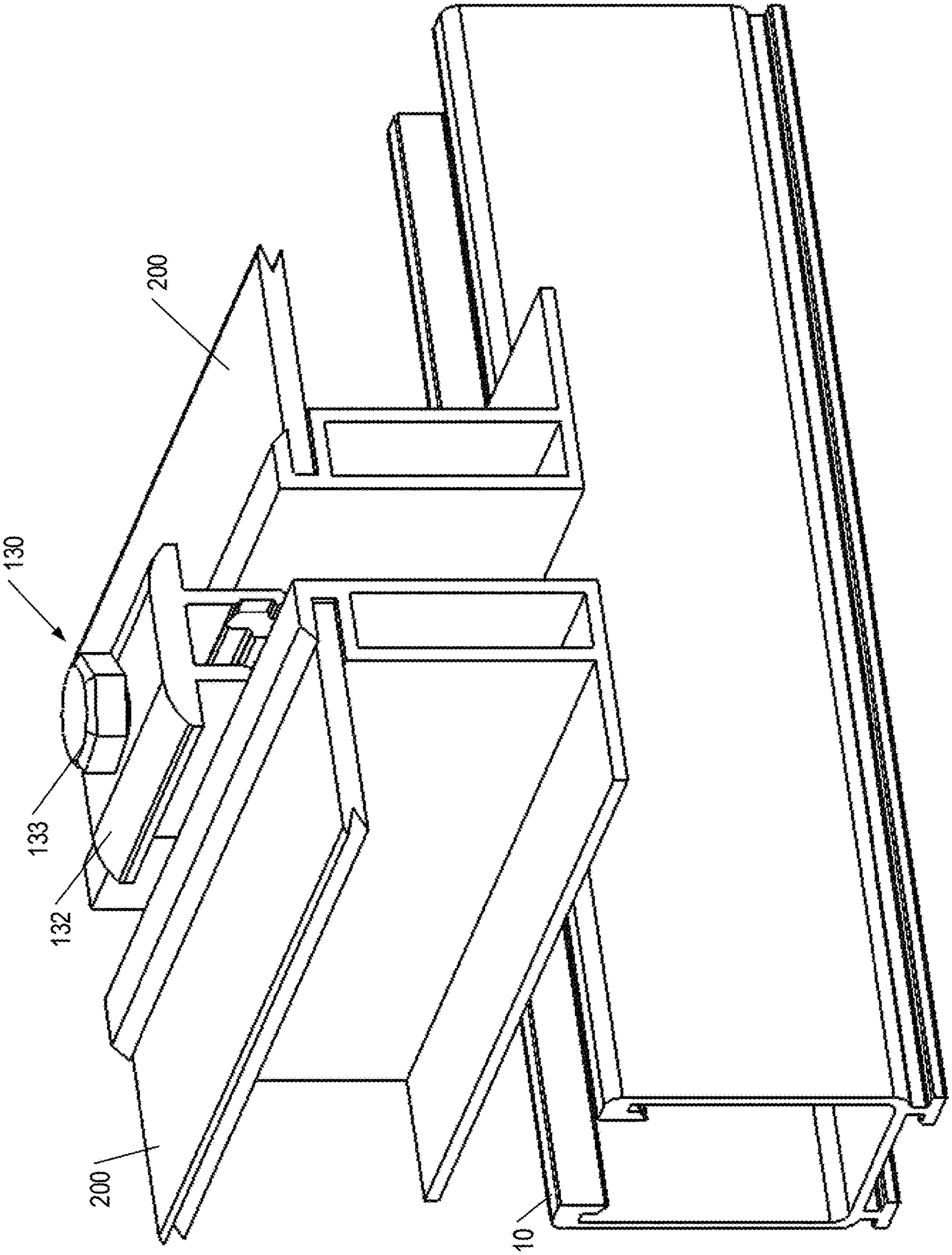
FIG. 15 is a perspective view of a mid-clamp secured relative to adjacent modules according to one embodiment.
Figure 16B:
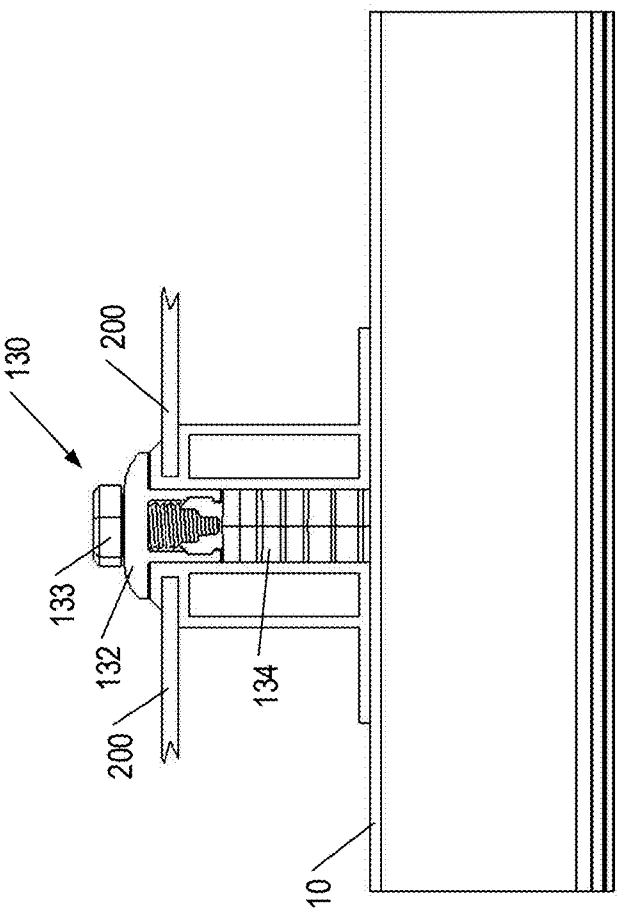
FIGS. 16A-16B are side views of a mid-clamp securing adjacent modules relative to a rail according to one embodiment.
Figure 16A:
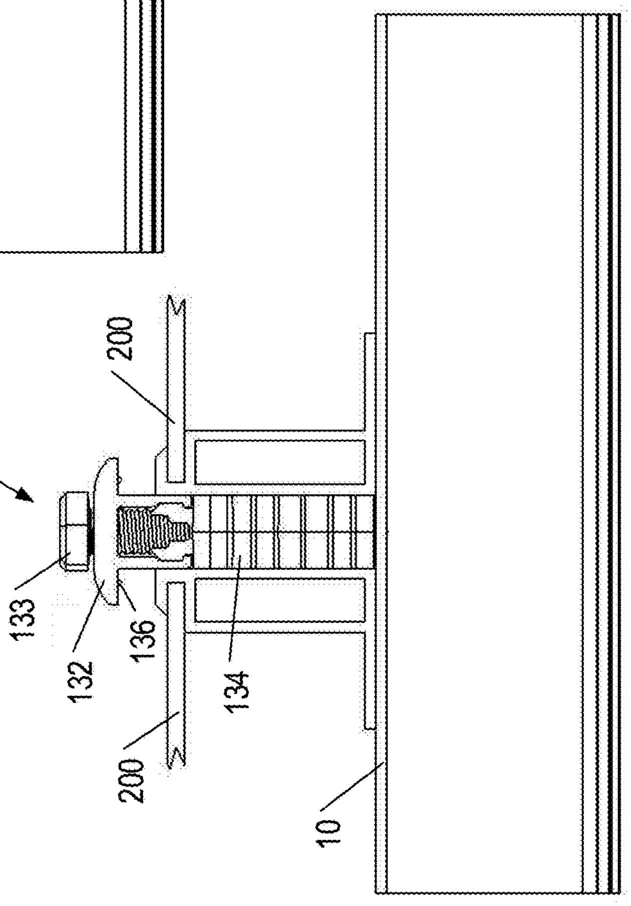

FIGS. 14A-14D illustrate a mid-clamp 130 configured to be secured between adjacent modules 200 (e.g., solar panels) to simultaneously clamp both adjacent modules 200 relative to a rail 10. As illustrated, the mid-clamp 130 comprises an integrated resilient member 134 (e.g., spring) to case the installation process by ensuring the clamp component 132 remains above the top surface of the modules 200 (as shown in FIG. 15) until tightened. The integrated resilient member 134 also ensures the channel nut 131 of the mid-clamp 130 remains engaged with the rail channel. Like the outer end clamp 120 disclosed herein, the mid-clamp comprises a channel nut 131, a clamp component 132 (which may comprise puncture elements 136, visible in FIG. 17C, discussed below), and a fastening member 133. The integrated resilient member 134 surrounds the fastening member 133 to support the clamp component 132 at a distance relative to the channel nut 131. As illustrated in FIGS. 16A-16B (which show the mid-clamp 130 in a raised position and a clamped position, respectively, relative to adjacent modules 200), the resilient member 134 compresses as the fastening member 133 is tightened. Moreover, the resilient member 134 may have a width (measured between adjacent modules 200) corresponding to (e.g., at least substantially the same as) or thinner than the width of the clamp component 132, such that adjacent modules 200 may be pressed against opposite surfaces of the clamp component 132 when secured therein.

In certain embodiments, the clamp component 132 may have a hollow interior portion configured to accept a portion of the resilient member 134 therein to prevent the resilient member 134 from rotating relative to the clamp component 132. In certain embodiments, the resilient member 134 may comprise a plastic material, a metal material, and/or the like. Moreover, the resilient member 134 may define at least substantially vertical side edges (e.g., edges positioned adjacent modules 200). The resilient member 134 may be configured such that the width of the resilient member 134 (measured between vertical edges) does not change as the resilient member 134 is compressed and/or expanded. As shown in FIGS. 14A-14D, the resilient member defines an at least substantially horizontal base surface configured to extend across a rail channel, two oscillating vertical members, and a top portion configured to be secured within the clamp component 132. The oscillating vertical members comprise thin resilient sheets having a sinusoidal or other curved shape that, when compressed, form at least substantially stacked sheet portions such that the perimeter dimensions of the resilient member 134 remain at least substantially unchanged as the resilient member 134 is compressed.

As shown in the figures, the top portion comprises resilient clips configured to be clipped into corresponding channels of the clamp component 132 such that the resilient member 134 remains secured relative to the clamp component 132. This detachable securing of the resilient member 134 relative to the clamp component 132 may facilitate assembly of the mid-clamp 130, and may ensure that the clamp component 132 is not rotatable relative to the resilient member 134 to create an interference between the clamp component 132 and modules 200 to be secured by the mid-clamp 130 that may impede the modules 200 from being securely positioned fully under the horizontal clamp portions of the clamp component 132.

The mid-clamp 130 may operate similarly to the outer end clamp 120 discussed herein. The channel nut 131 is configured to engage bottom surfaces of flanges defining a rail channel. The channel nut 131 may be configured to remain below a top surface of the rail 10, such that the module 200 is clamped against a top surface of the rail 10 when secured thereon. Moreover, the channel nut 131 comprises a threaded aperture extending therethrough configured to accept the fastening member 133 therein, such that the fastening member 133 is tightened relative to the channel nut 131. The clamp component 132 has elongated horizontal clamp surfaces proximate a top portion of the clamp component 132. The clamp surfaces are configured to engage top horizontal surfaces of a module 200 as the fastening component 133 is tightened, to clamp the modules 200 relative to the rail 10. Moreover, as shown in the figures, the clamp component 132 comprises at least substantially vertical body surfaces below the horizontal clamp surfaces. The body surfaces are configured such that vertical edges of adjacent modules 200 may be pressed against the body surfaces of the clamp component 132 to ensure the adjacent modules 200 are securely positioned below the horizontal clamp surfaces of clamp component 132. The clamp component 132 further defines an aperture therein configured to slidably accept the fastening member 133 therein. The aperture extends vertically through the body portion of the clamp component 132, such that the clamp component 132 may be clamped against modules 200 secured therein.

Moreover, the mid-clamps 130 may be utilized proximate an end of a module 200 installation, such that only a single module 200 is secured by the mid-clamp 130. As shown in FIGS. 17A-17D, the mid-clamp 130 may be utilized with an edge spacer 135 configured to be secured within one side of the mid-clamp 130. Spacers 135 may be formed of a rigid plastic material, a metal material (e.g., a material identical to the frame material of module 200, such as aluminum, steel, and/or the like). By utilizing a material identical to that included within a module 200, the spacer 135 may thermally expand and/or contract at a rate identical to the module 200, such that the spacer 135 and module 200 provide identical forces on the mid-clamp 130 as the temperature of the components change. In certain embodiments, spacers 135 may be provided in various lengths corresponding to different heights of modules 200 to be utilized with the mid-clamps 130. However in certain embodiments, the spacers 135 may be provided in a single length, and may be cut (e.g., at an installation site) to be custom sized to correspond to the height of the modules 200.

Figure 17B:
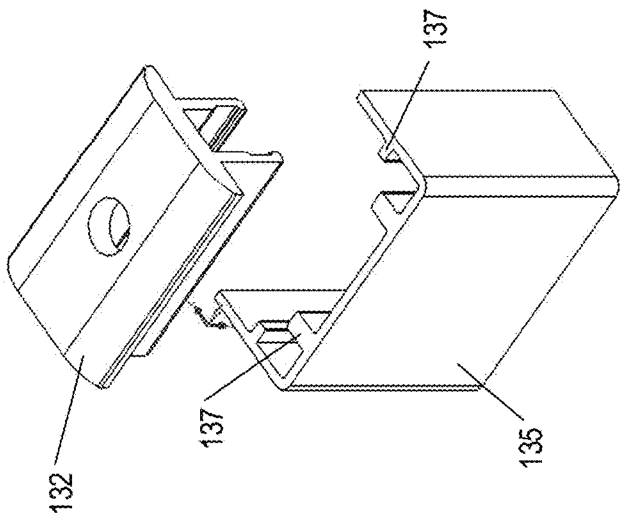
FIGS. 17A-17D are various views of a mid-clamp having a spacer according to one embodiment.
Figure 17C:
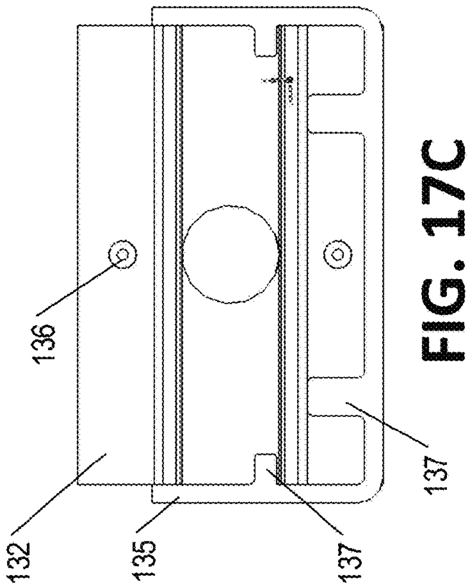
Figure 17A:
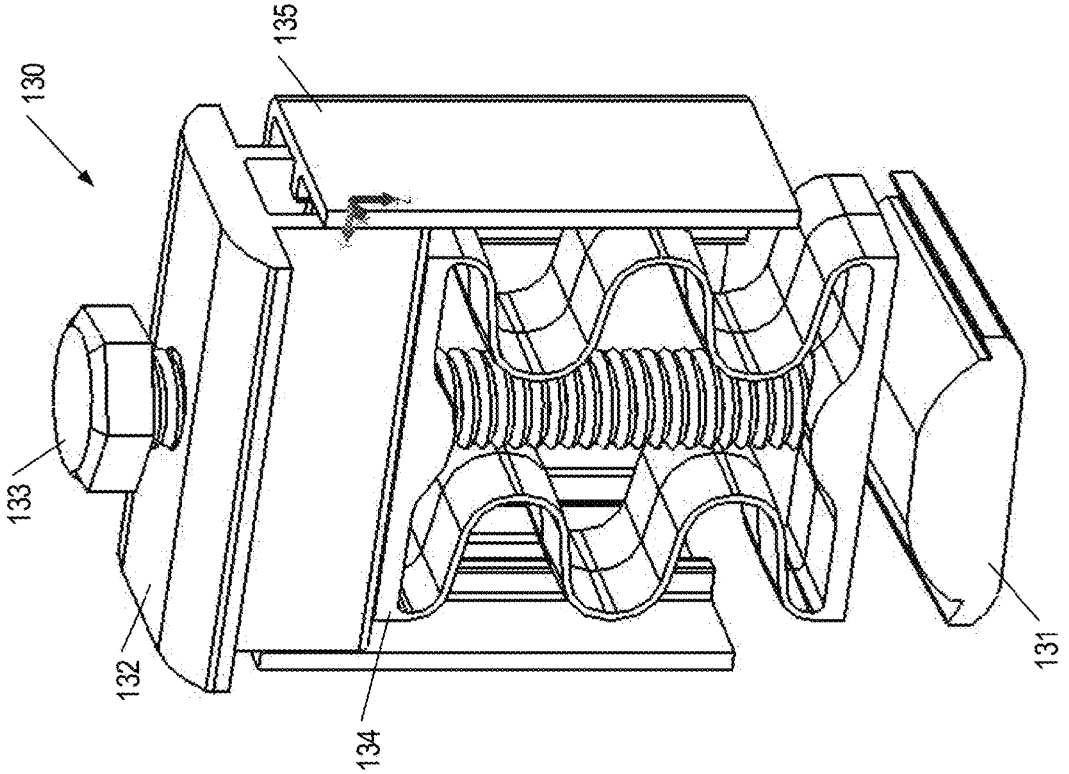
Figure 17D:
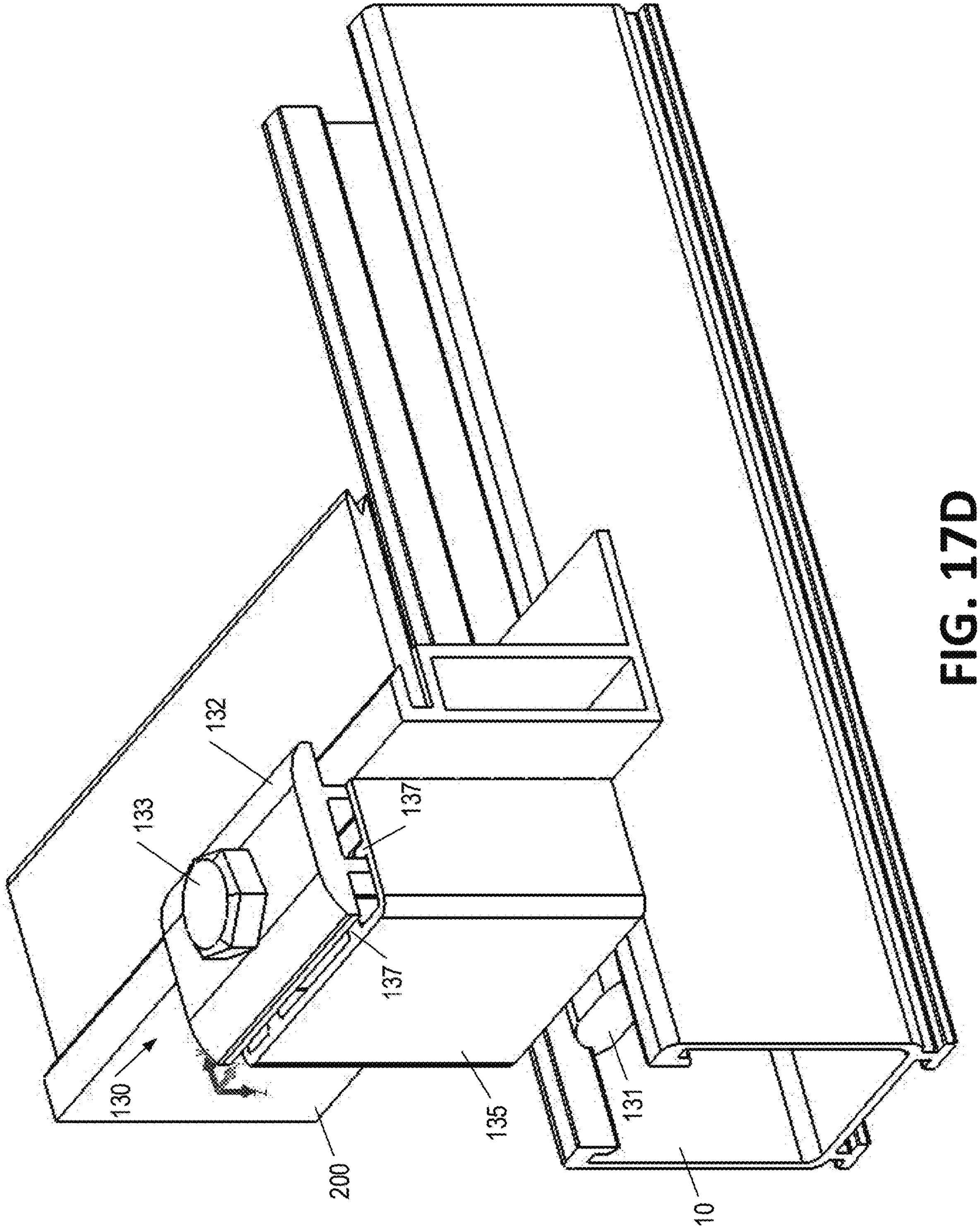

In certain embodiments, the spacer 135 may have a width configured to extend from a first body surface (to be secured adjacent the module 200, along the width of the body portion, and to an edge of a horizontal clamp member opposite the first body surface (e.g., spaced a distance away from the first body surface). Accordingly, the spacer may be configured to provide a smooth, finished surface visible at an edge of the module 200, such that the resilient member 134 and/or clamp component 132 are not visible within the spacer 135. As shown in FIGS. 17B-17C, the spacer 135 may comprise standoffs 137 molded within the spacer 135. The standoffs 137 may be configured to engage the body portion of the clamp component 132 (e.g., an exterior surface of the clamp component 132 and/or an interior surface of the clamp component 132). In certain embodiments, the standoffs 137 may be configured to snap onto the clamp component 132, such that the spacer 135 is detachably secured relative to the clamp component 132. This configuration may case installation of the module 200 and spacer 135 relative to the mid-clamp 130, because the spacer 135 and mid-clamp 130 are provided as a self-contained component that may be secured relative to the rail 10 and module 200.

Convertible Clamp

Figure 18B:
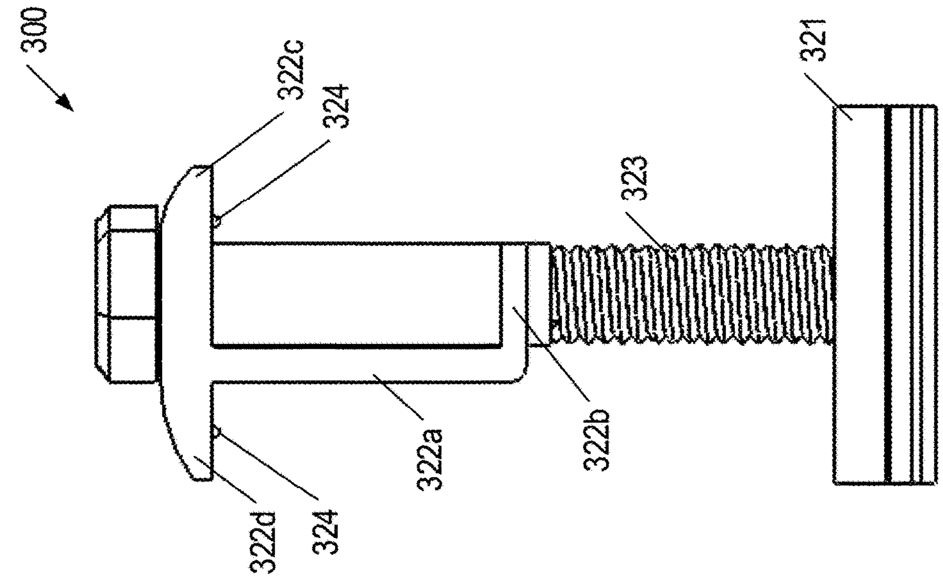
FIGS. 18A-18B are views of a convertible clamp according to one embodiment.
Figure 18A:
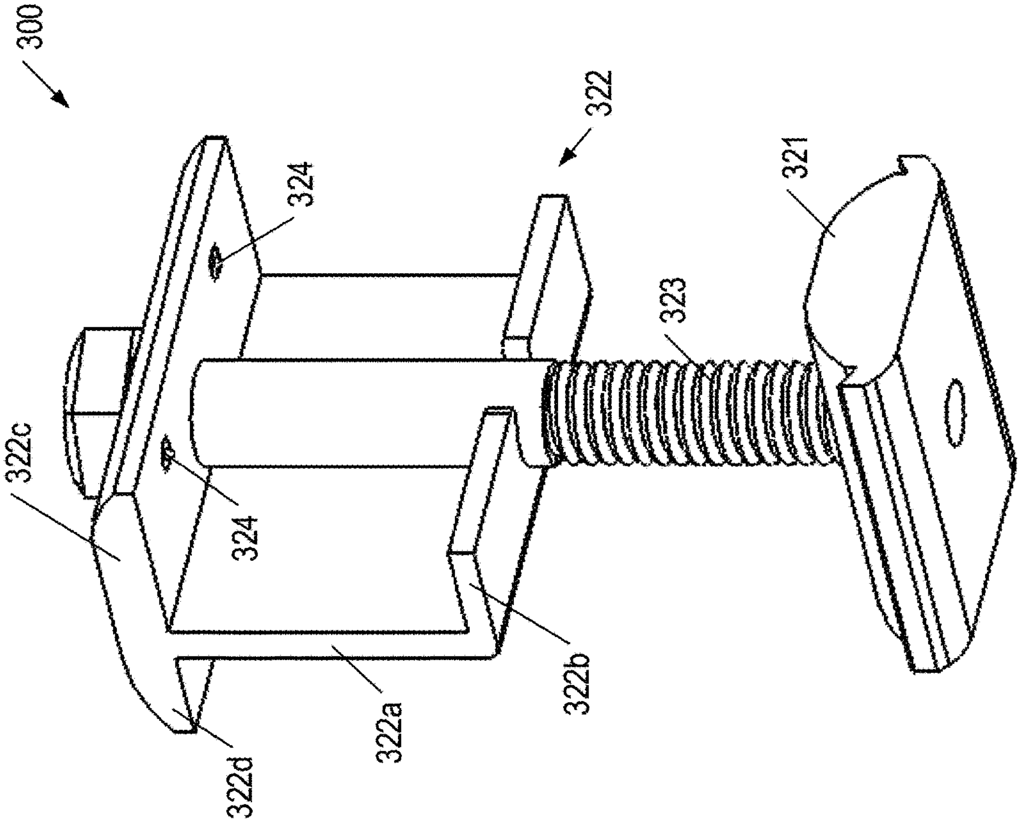
Figure 19:
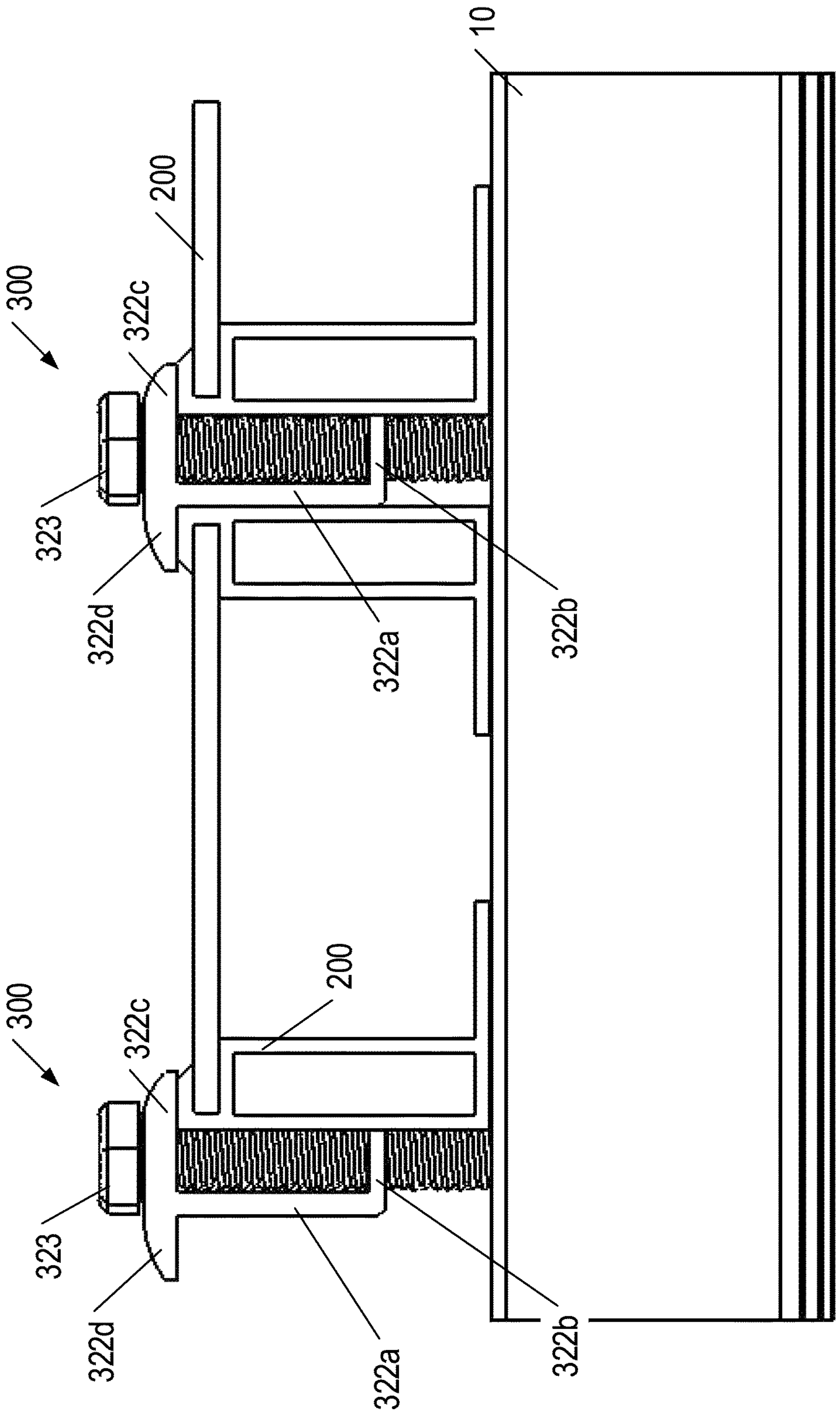
FIG. 19 is a side view of convertible clamps securing modules relative to a rail according to one embodiment.

Solar panel modules 200 may be secured relative to rails 10 via one or more convertible clamps 300. Example convertible clamps 300 according to certain embodiments are shown in FIGS. 18A-18B. The convertible clamps 300 shown in FIGS. 18A-18B may be configured to secure a single module 200 (e.g., solar panel module) relative to a rail 10 or to secure a plurality (e.g., two) modules 200 relative to the rail 10, as shown in FIG. 19.

With reference again to the isolated views of FIGS. 18A-18B, a convertible clamp 300 configured according to certain embodiments provides an upward facing fastening member 323 (e.g., having a tool engagement portion/head, such as a bolt head, accessible at a top end of the convertible clamp 300) that may provide for quicker and/or easier installation. The illustrated convertible clamp 300 is configured to fit a range of module frame sizes, since there are no established standards for module frames.

The convertible clamp 300 shown in FIGS. 18A-18B comprises a channel nut 321 configured to engage a rail 10 (e.g., a bottom surface of flanges of a rail channel), a clamp component 322, and a fastening member 323. The fastening member 323 is slidably engaged with the clamp component 322 and is threaded into a threaded aperture of the channel nut 321. In certain embodiments, the channel nut 321 height is configured such that it does not extend beyond the top surface of a rail 10 in which it is secured, such that tightening the fastening member 323 to secure a module 200 relative to the rail 10 causes the clamp component 322 to clamp the module 200 relative to the top surface of the rail 10.

As shown in FIGS. 18A-18B, the clamp component 322 defines a modified "C" shape, having a vertical body portion 322*a*, a horizontal bottom leg 322*b* having a first length and extending away from the vertical body portion 322*a* in a first direction, and a horizontal top leg comprising a first top leg portion 322*c* having a second length and extending away from the vertical body portion 322*a* in the first direction and a second top leg portion 322*d* having a third length and extending away from the vertical body portion 322*a* in a second direction at least substantially opposite the first direction. In the illustrated embodiment of FIGS. 18A-18B, the second length (the length of the first top leg portion 322*c*) is longer than the first length (the length of the bottom leg portion 322*b*). In certain embodiments, the second length (the length of the first top leg portion 322*c*) is longer than the third length (the length of the second top leg portion 322*d*). In certain embodiments, the second length (the length of the first top leg portion 322*c*) is at least substantially equal to or greater than the combination of (1) the diameter of a body portion of the fastening member 323 and (2) the third length (the length of the second top leg portion 322*d*), such that the first top leg portion 322*c* and the second top leg portion 322*d* are configured to engage at least substantially equal lengths of a module 200 secured thereby.

In various embodiments, the end of the bottom leg portion 322*b* is configured to engage a vertical surface of a module 200 secured under the first top leg portion 322*c*, to prevent the clamp component 322 from pivoting relative to the first top leg portion 322*c* when nothing is secured under the second top leg portion 322*d* (or in embodiments in which the first top leg portion 322*c* is thicker than the second top leg portion 322*d*, as discussed herein) and the fastening member 323 is tightened. Thus, as discussed herein, the convertible clamp 300 may be utilized in an end condition, in which only one module 200 is secured under a first side of the convertible clamp 300 or in a mid-condition, in which a first module 200 is secured under the first top leg portion 322*c* and a second module is secured on an opposite side of the convertible clamp 300 under a second top leg portion 322*d*.

In certain embodiments discussed in greater detail herein, the bottom surface of the first top leg portion 322*c* may be lower than the bottom surface of the second top leg portion 322*d*. In such configurations (in other words, the first top leg portion 322*c* may be thicker than the second top leg portion 322*d*), the first top leg portion 322*c* may be configured to secure a first module 200 by engaging a top surface of the first module 200 and clamping the first module 200 against a rail 10. Thus, once the first module 200 is secured between the rail 10 and the first top leg portion 322*c*, the distance between the top surface of the rail and the bottom surface of the first top leg portion 322*c* is at least substantially equal to the height of the module 200. In this configuration, the distance between the top surface of the rail 10 and the bottom surface of the second top leg portion 322*d* is slightly larger than the height of the first module 200, such that a second, matching module 200 may be slid between the second top leg portion 322*d* and the rail 10.

The top leg portion has an aperture extending therethrough (e.g., within the first top leg portion 322*c*) aligned with a slot within the bottom leg portion 322*b* for the fastening member 323 to extend therethrough (e.g., at least substantially parallel to the vertical body portion 322*a*). As mentioned, the first top leg portion 322*c* is configured to engage a horizontal surface of a first module 200 (e.g., solar panel) pressed against an end of the bottom leg portion 322*b*, such that the module 200 is clamped against the top surface of the rail 10 as the fastening member 323 is tightened as shown in FIG. 2. Similarly, the second top leg portion 322*d* is configured to engage a horizontal surface of a second module 200 (e.g., solar panel) pressed against a portion of the vertical body portion 322*a* such that the second module 200 is clamped against the top surface of the rail 10 as the fastening member 323 is tightened. As shown in FIG. 2, the fastening member 323 may be placed close to the first module 200 frame (e.g., in contact with the module frame) to impede rotation of the clamp component 322 relative to the module 200.

Moreover, as shown in FIGS. 18A-18B, the bottom surface of the top leg (e.g., one or more of the first top leg portion 322c and/or the second top leg portion 322d) defines one or more puncture elements 324 (e.g., sharp pins) configured to puncture and/or indent the surface of a module 200 as the fastening element 323 is tightened to impede sliding and or rotation of the module 200 relative to the convertible clamp 300. The puncture elements 324 may also serve to provide a reliable electrical connection between the module frame and the rail 10. These puncture elements 324 may be integrally formed with the clamp component 322, may be formed by punching or securing pins relative to the clamp component 322, and/or the like.

Figure 20B:
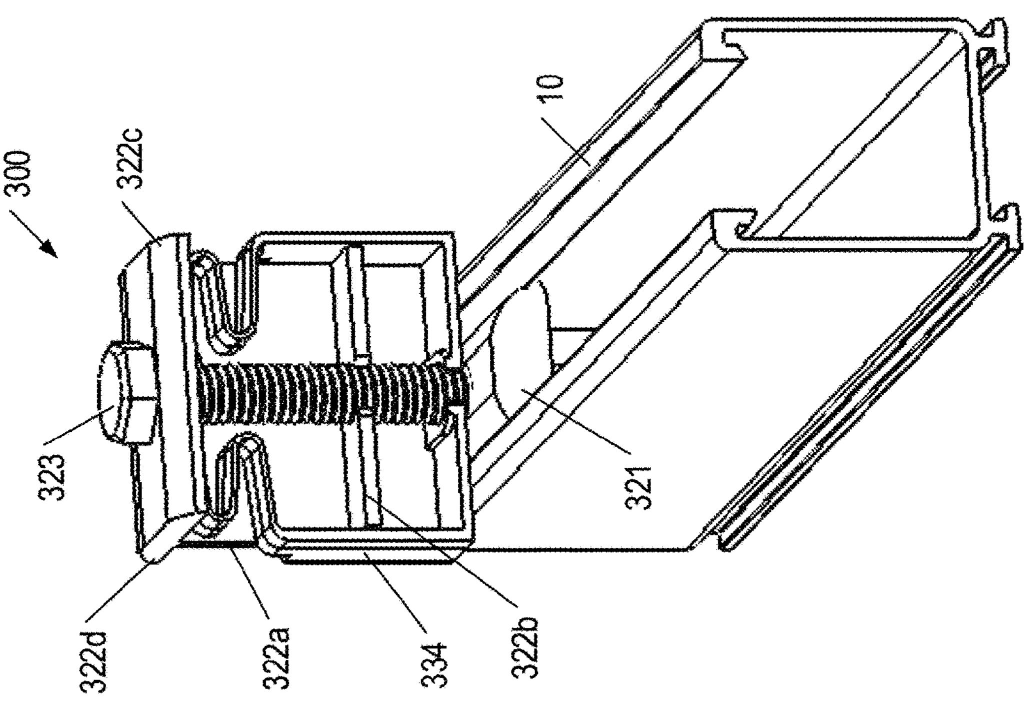
FIGS. 20A-20C are perspective views of a convertible clamp according to one embodiment.
Figure 20A:
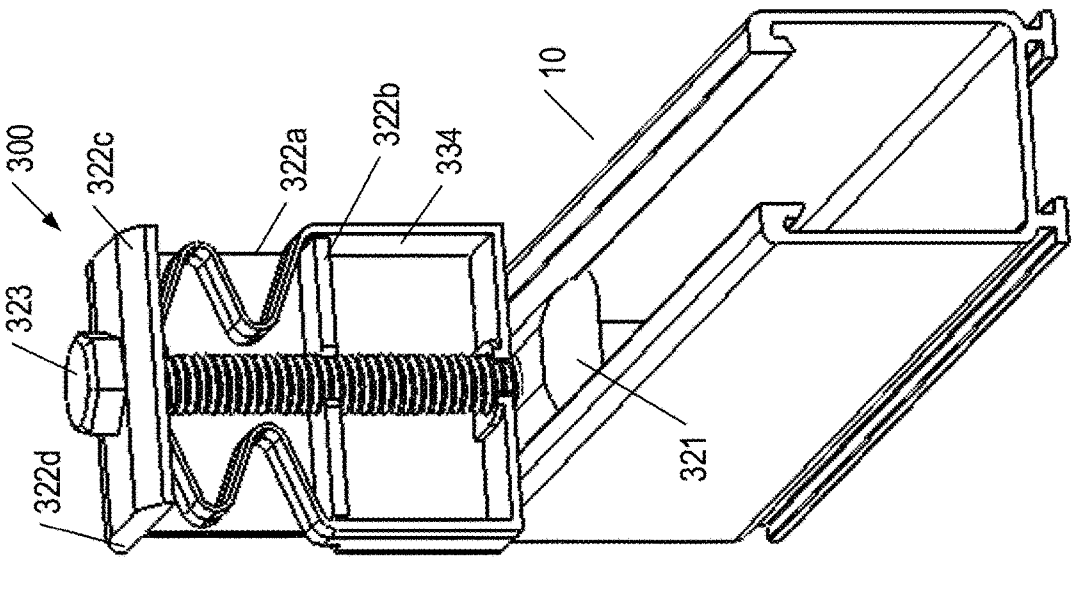
Figure 20C:
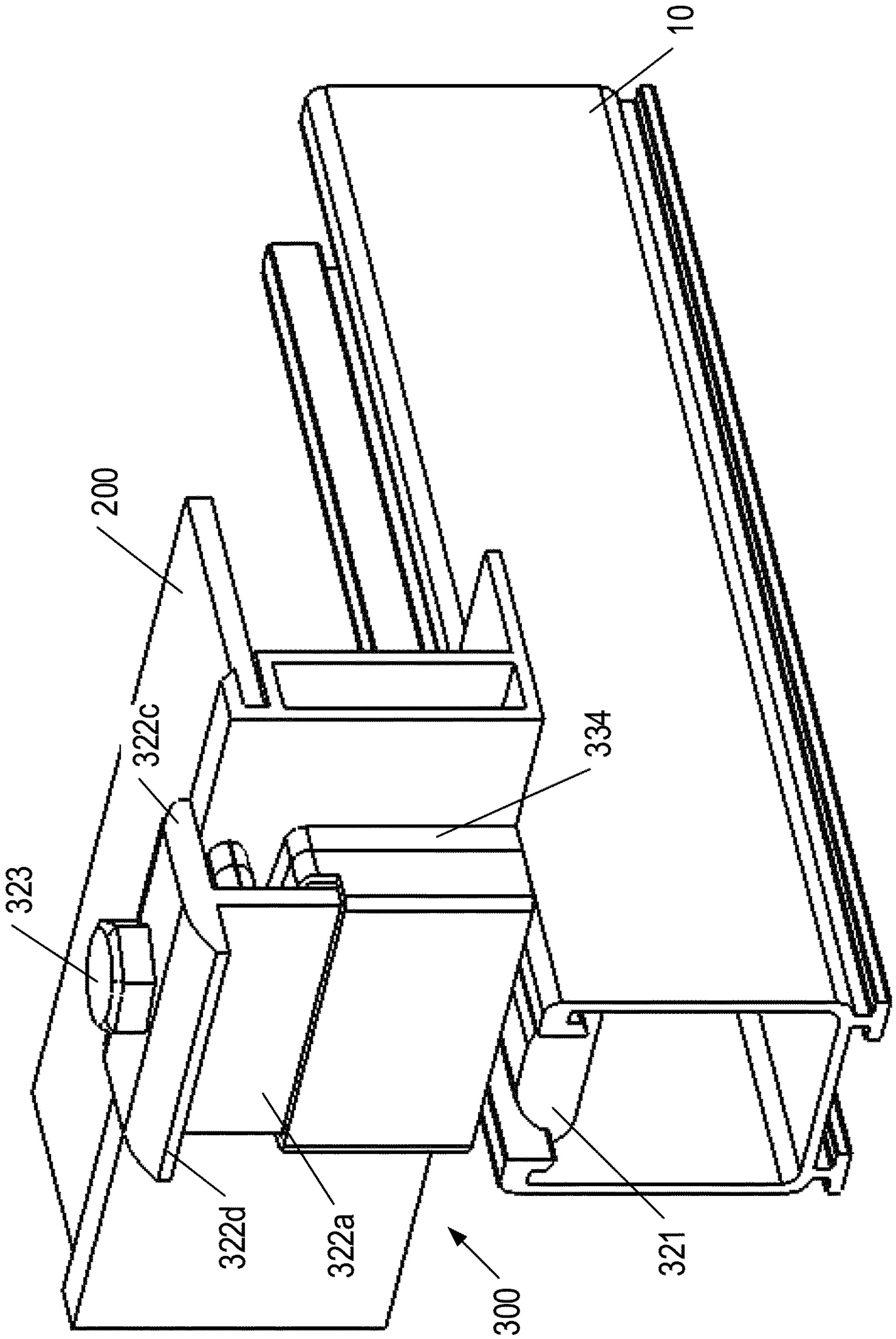

In certain embodiments, the convertible clamp 300 comprises an integrated resilient member 334 (e.g., spring) as shown in FIGS. 20A-20C to case the installation process by ensuring the clamp component 322 remains above the top surface of the modules 200 until tightened. The integrated resilient member 334 also ensures the channel nut 321 of the convertible clamp 300 remains engaged with the rail channel. As shown in FIGS. 20A-20C, the integrated resilient member 334 surrounds the fastening member 323 to support the clamp component 322 at a distance relative to the channel nut 322. As illustrated in FIGS. 20A-20B (which show the mid-clamp 330 in a raised position and a clamped position, respectively), the resilient member 334 compresses as the fastening member 323 is tightened.

Figure 21:
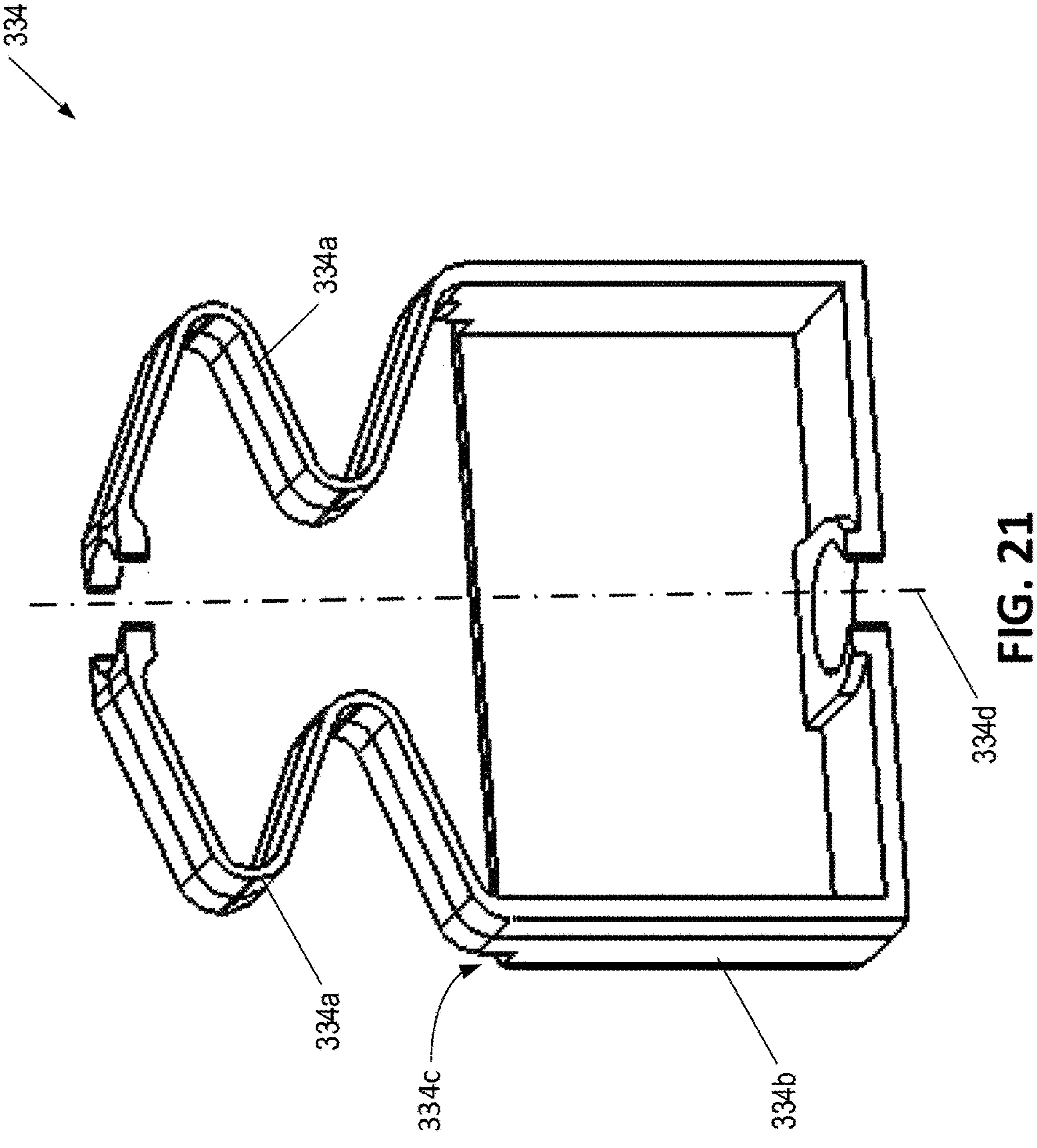
FIG. 21 is an isolated perspective view of a resilient member of a convertible clamp according to one embodiment.

FIG. 21 is an isolated view of a resilient member 334 according to one embodiment. The resilient member 334 shown in FIG. 21 comprises a plurality (e.g., two) resilient arms 334a extending away from a body portion 334b. The resilient arms 334a define a zig-zag pattern between a bottom end (integrated with a top edge of the body portion 334b) and a top end (defining a portion of a fastening member axis through a central portion of the resilient member 334. The resilient member 334 may comprise a plastic material, a metal material, a rubber material, or any other resilient material enabling the resilient arms 334a to be deformed via compression (to compress the plurality of resilient arm portions against one another) and to return to an uncompressed configuration once the compressive force is released. For example, the resilient arms 334a are configured to change between the configurations shown in FIG. 20A (uncompressed) and FIG. 20B (compressed) based on the compressive force applied via fastening member 323.

With reference again to FIG. 21, the body portion 334b defines a partially enclosed portion (having an open side) configured to fit around a portion of the clamp component 322. A closed vertical back wall of the body portion 334a is spaced laterally relative to the resilient arms 334a to define a gap 334c through which the vertical portion 322a of the clamp component 333 slidably extends. Specifically, a front side of the resilient arms 334a is aligned with an open side of the body portion 334b, such that a front edge of each of the resilient arms 334a and the body portion 334b are aligned. The resilient arms 334a have a width (measured between the front edge and a back edge of the resilient arms 334a) that is less than a width of the body portion (measured between the front edge and a front surface of the back wall), such that the front surface of the back wall is laterally spaced away from the back edge of the resilient arms 334a (visible in FIG. 20C). Thus, when secured onto a convertible clamp 300, the vertical portion 322a of the clamp component 322 slides through the gap 334c, and adjacent to the back edge of the resilient arms 334a as the convertible clamp 300 is compressed (e.g., by tightening fastener member 323).

Moreover, the resilient member 334 defines openings aligned with a central axis 334d of the resilient member 334 to accept the fastening member 323 extending therethough. As shown in FIG. 21, the openings are defined between opposing top ends of the resilient arms 334a (the top end of each resilient arm defining a concave, curved end having a radius of curvature matching an outer diameter of the fastening member 323) and an opening in a bottom wall of the body portion 334b. As visible in FIGS. 20A-20B, when installed on a convertible clamp 300, the fastening member 323 extends along the axis 334d to secure the resilient member 334 onto the convertible clamp 300. Moreover, at least one of the top and bottom openings (e.g., both the top and bottom openings) may have open sides to enable the fastening member 323 to be clipped into the openings to align the fastening member 323 with the axis 334d.

Figure 22:
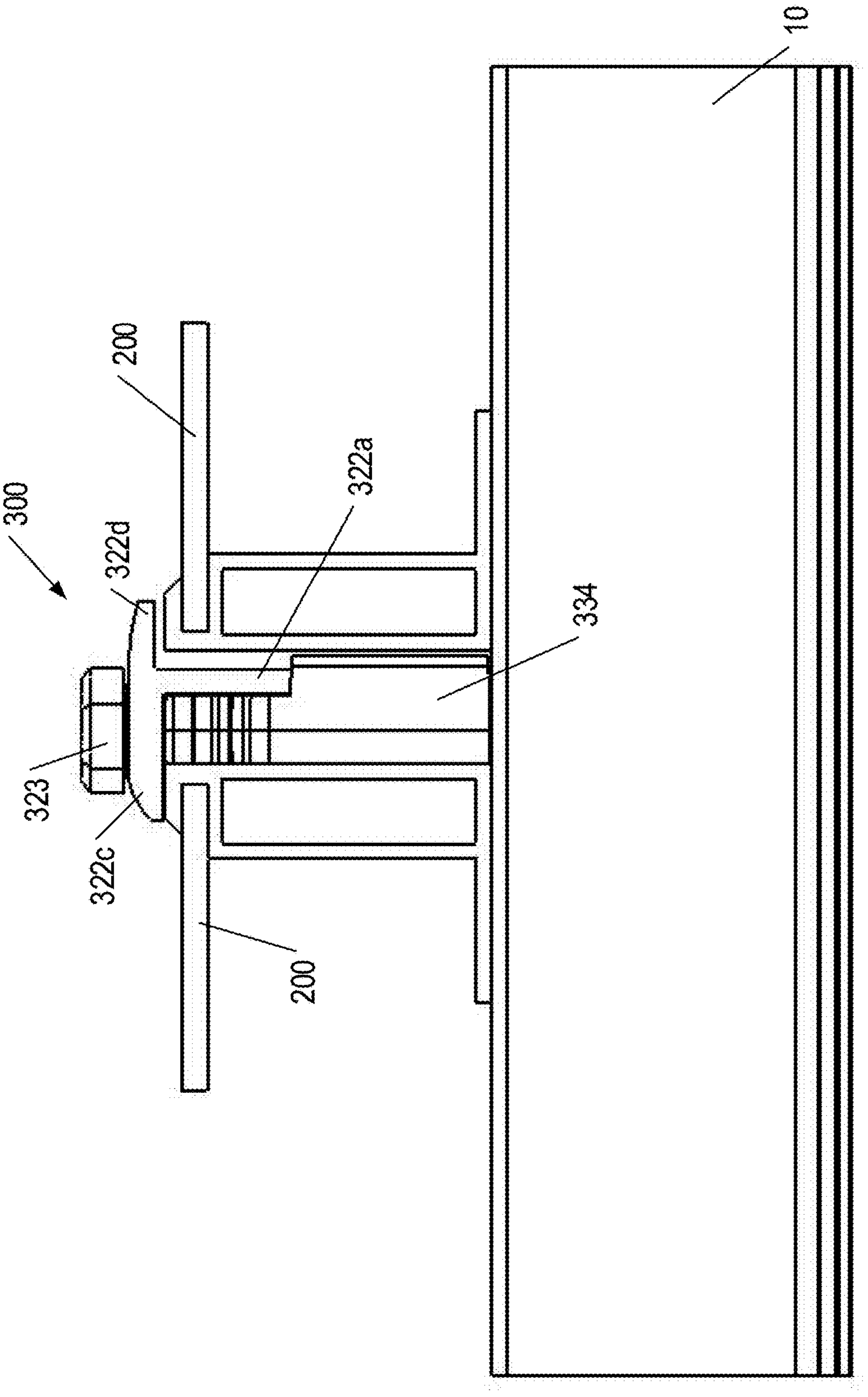
FIG. 22 is a side view of a convertible clamp securing modules relative to a rail according to one embodiment.

As shown in FIG. 22, the back wall of the body portion 334b is thin such that, when installed on a convertible clamp 300, the second top leg portion 322d extends laterally away from the vertical portion 322a by a distance greater than the distance between the vertical portion 322a and the back surface of the back wall of the body portion 334b. Accordingly, the second top leg portion 322d may be utilized to secure a module 200 thereunder with the resilient member 334 secured around the convertible clamp 300.

FIG. 22 illustrates a side view of a convertible clamp 300 installed on a rail 10 and securing a single module 200 relative to the rail 10. As shown therein, the convertible clamp 300 remains stable (e.g., vertical relative to the rail 10 and module 200) such that the convertible clamp 300 may be utilized to secure single modules 200 to rails 10 without needing additional objects (e.g., second modules 200) placed on an opposite side of the convertible clamp 300 to balance the convertible clamp 300.

Figure 23:
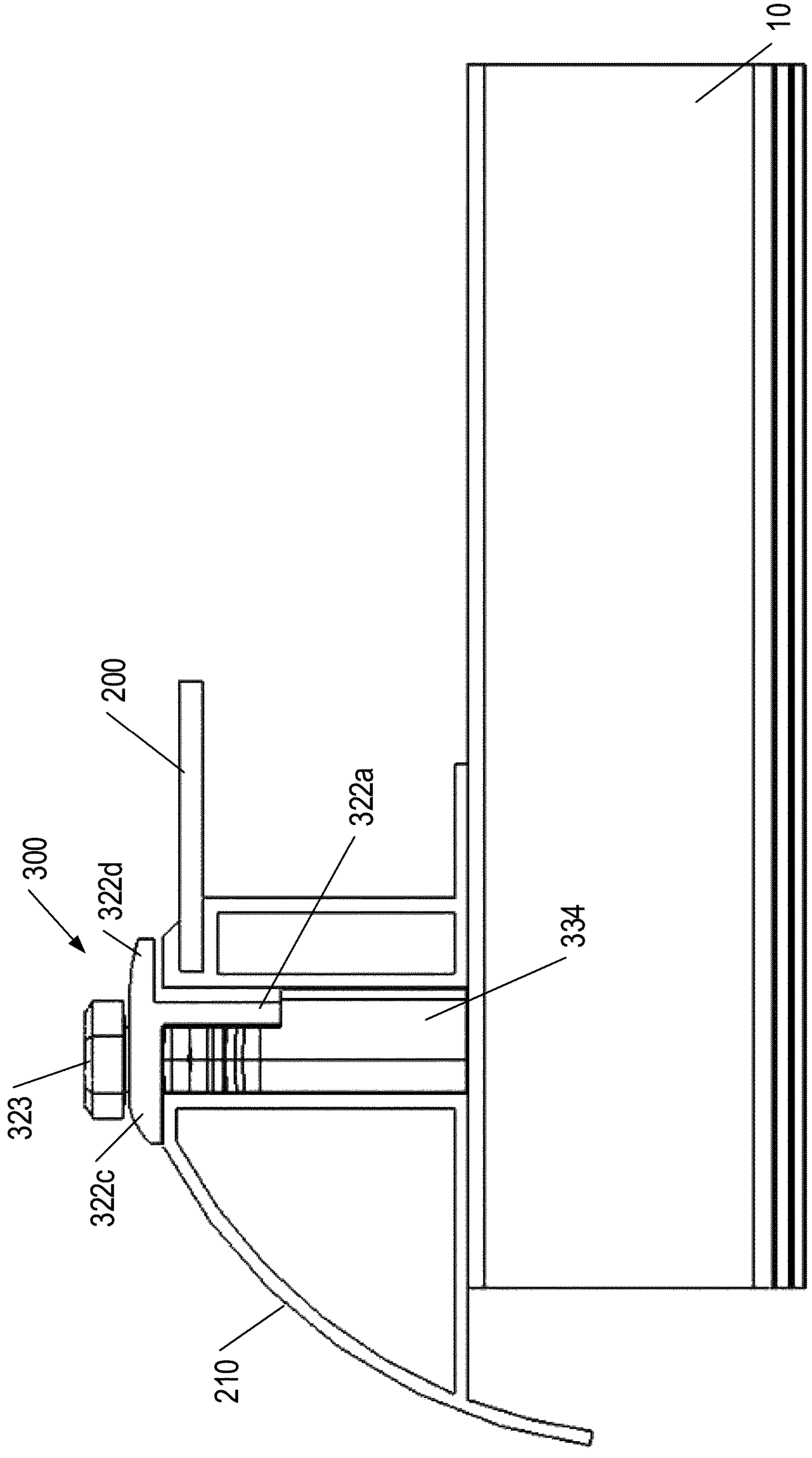
FIG. 23 is a side view of a convertible clamp securing a skirt and a module relative to a rail according to one embodiment.
Figure 24:
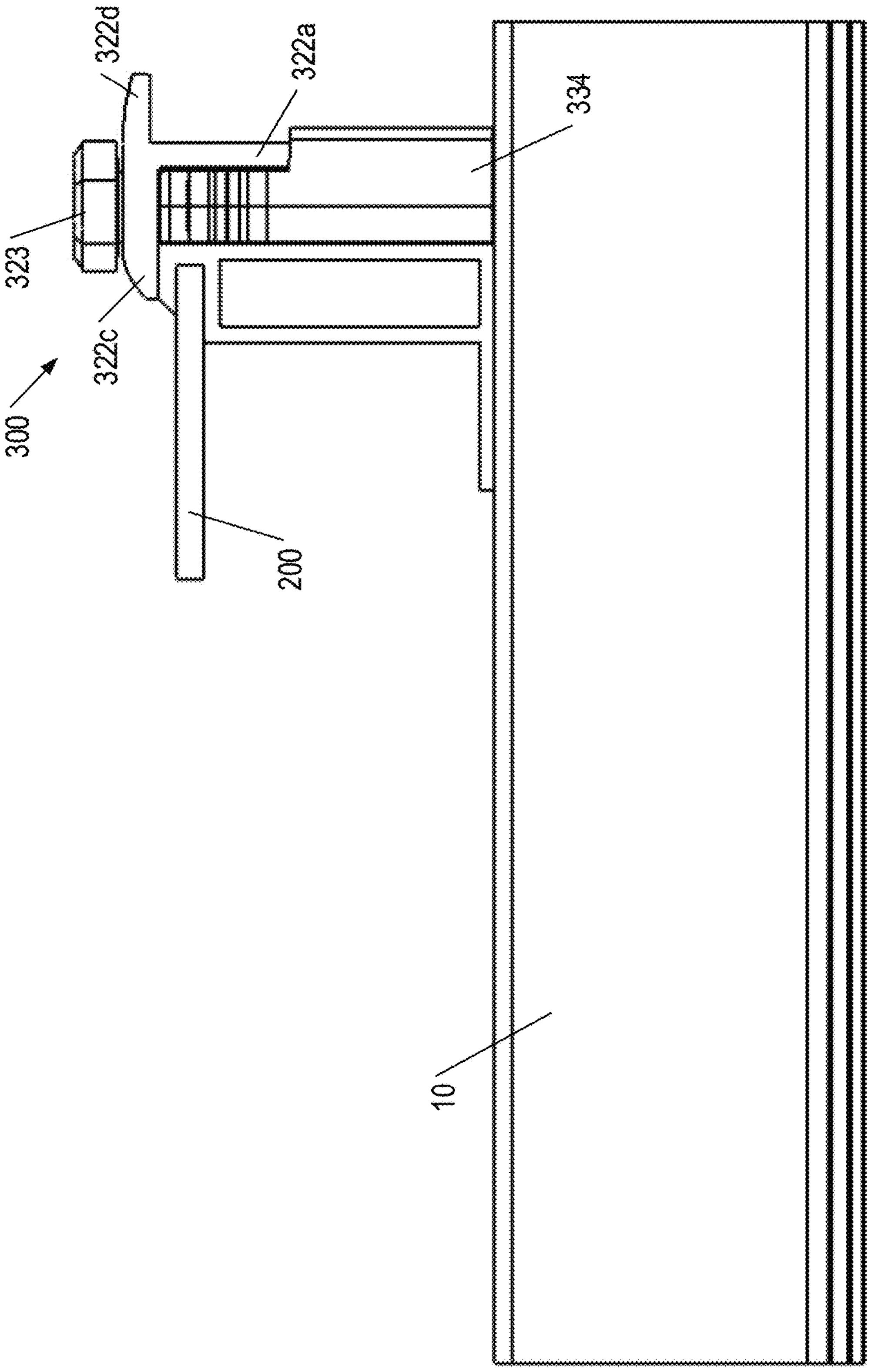
FIG. 24 is a side view of a convertible clamp securing a module relative to a rail according to one embodiment.

FIG. 23 illustrates a side view of a convertible clamp 300 installed on a rail 10 and securing a module 200 and a skirt 210 relative to the rail 10 (FIG. 24 shows a similar configuration, securing a module 200 relative to the rail 10, without a skirt 210). The skirt 210 may be embodied as an elongated member (e.g., a hollow member) that may be utilized to define a bottom edge of a module 200 installation array to provide a desirable aesthetic for the module 200 installation array that may be installed on a pitched roof. The skirt 210 may comprise an extruded aluminum rail having a mill finish (e.g., no coating), an anodized finish, a painted finish, and/or the like. In certain embodiments, the skirt 210 may comprise an electrically conductive material that may be used to connect various module components relative to electrical ground. However, it should be understood that any of a variety of materials may be utilized, including, for example, stainless steel, carbon steel, titanium, carbon fiber, wood, plastic, and/or the like. Moreover, the skirts 210 may be formed by any of a variety of manufacturing mechanisms, such as extrusion, forging, casting, milling, and/or the like.

The skirt 210 may define a substantially planar, vertical back wall configured to be secured against a convertible clamp 300 and a substantially planar, horizontal (perpendicular to the back wall) bottom surface configured to be secured against a top surface of a rail 10. Moreover, the skirt 210 may comprise a short, horizontal top surface configured to be secured under a top leg portion (e.g., first top leg portion 322c or second top leg portion 322d) of the clamp component 322. The skirt 210 may further define an aesthetic surface extending from the top horizontal surface to (and/or past) the bottom horizontal surface). In the illustrated embodiment of FIG. 23, the aesthetic surface is curved, however the aesthetic surface may have any of a variety of configurations, including angled, slanted, defining one or more ridges or corners therein, and/or the like.

Figure 25A:
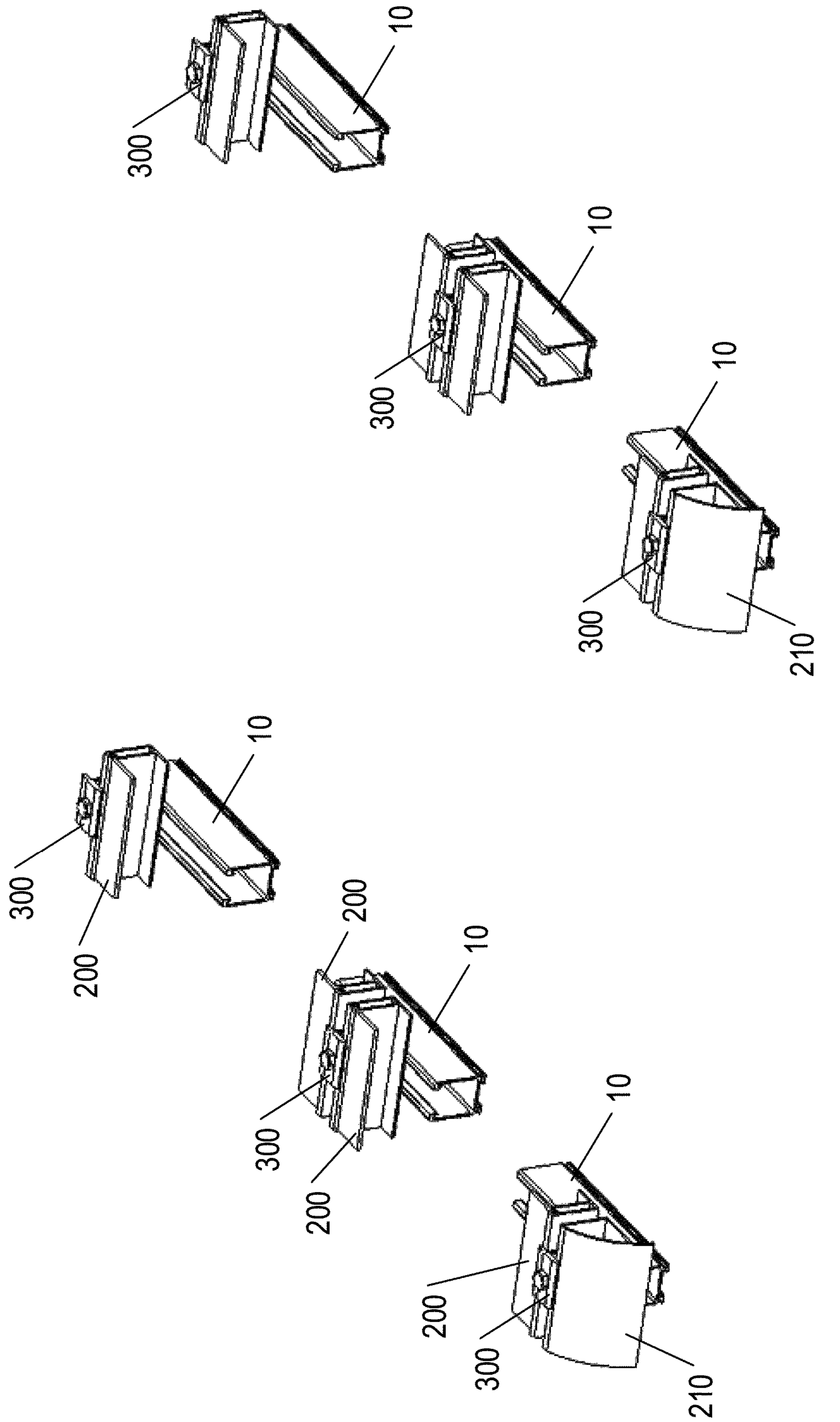
FIGS. 25A-26B are perspective views of module arrays according to various embodiments.
Figure 25B:
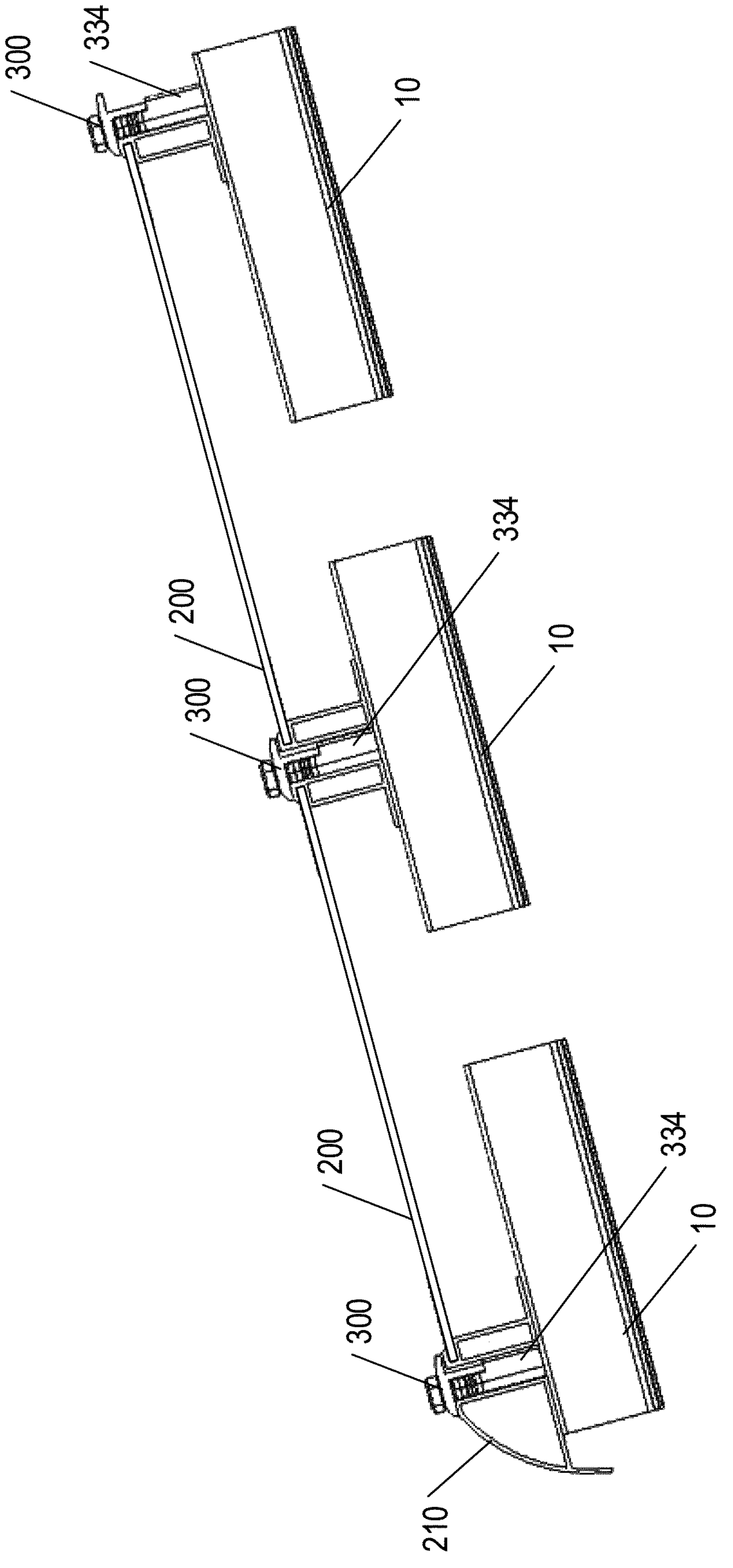

FIGS. 25A-26B illustrates various views of module 200 array installations according to various embodiments. Portions of the modules 200, specifically the solar panel portion of the modules 200 have been omitted in FIGS. 25A and 26A for purposes of illustration. Moreover, it should be understood that the modules 200 and/or skirt 210 may extend between adjacent rails 10 to provide an at least substantially continuous installation aesthetic. As shown in each of FIGS. 25A-26B, the clamps 300 configured as discussed herein may be utilized to secure skirts 210 relative to rails 10, to secure a single module 200 relative to the rails 10 and/or to secure two modules 200 relative to the rails 10. Specifically, as shown in FIGS. 25A-25B, a first convertible clamp 300 (e.g., bottom-most clamps 300 on each rail assembly shown in FIGS. 25A-25B) may be configured to secure a skirt 210 on a first side of the convertible clamp 300 (e.g., under first top leg portion 322*c*) and a module 200 under a second side of the convertible clamp 300 (e.g., under second top leg portion 322*d*). A second convertible clamp 300 (e.g., middle clamps 300 on each rail assembly shown in FIGS. 25A-25B) may be configured to secure a first module 200 under a first side of the clamp and a second module 200 under a second side of the clamp. Finally, a third convertible clamp 300 may be configured to secure a module 200 under a first side of the convertible clamp 300 while nothing is secured under the second side of the convertible clamp 300. Each of the clamps shown (first, second, and third clamps on each rail assembly) may be identical, thereby illustrating the various uses of the clamps 300 for installation of modules 200 relative to rails.

Figure 26A:
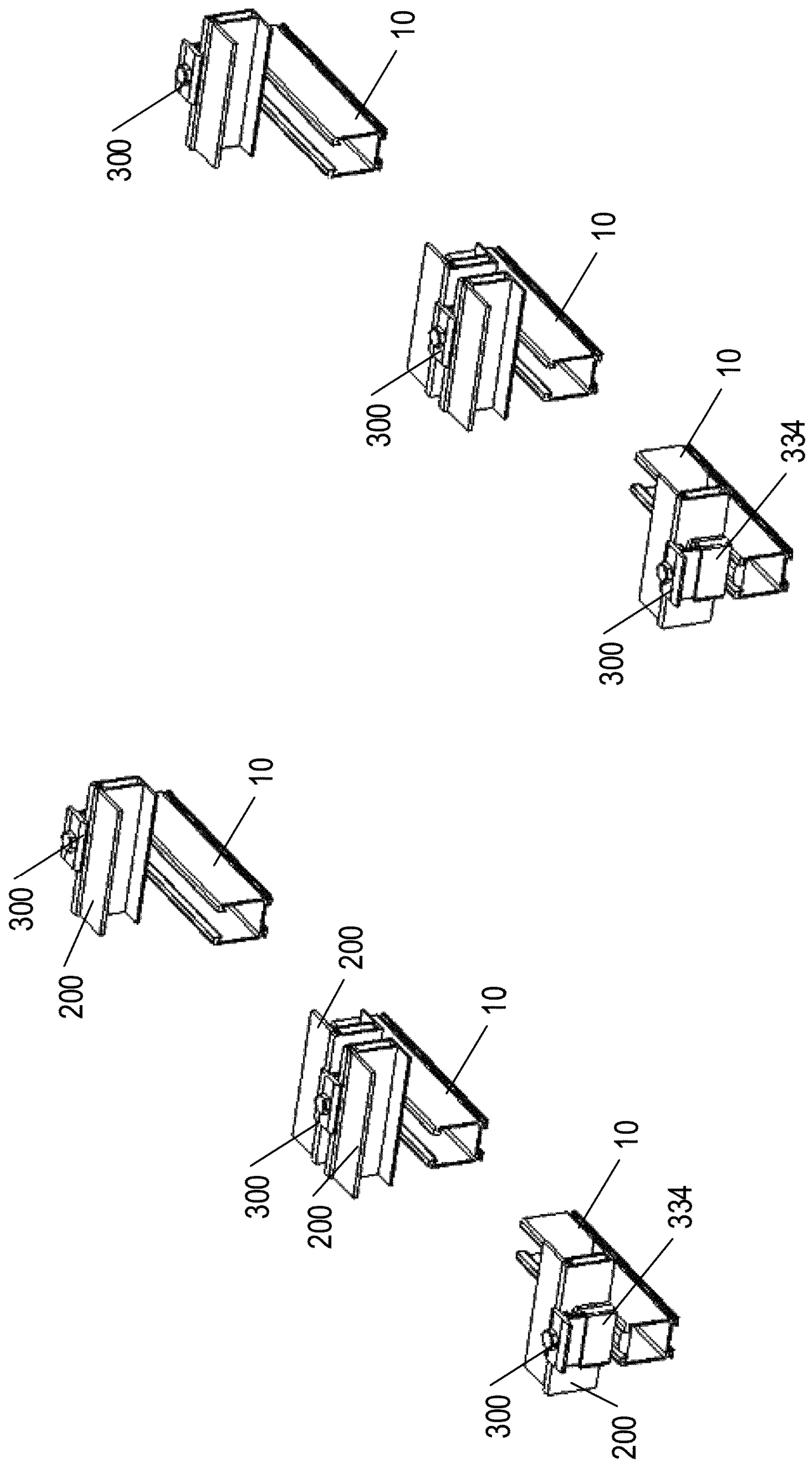
Figure 26B:
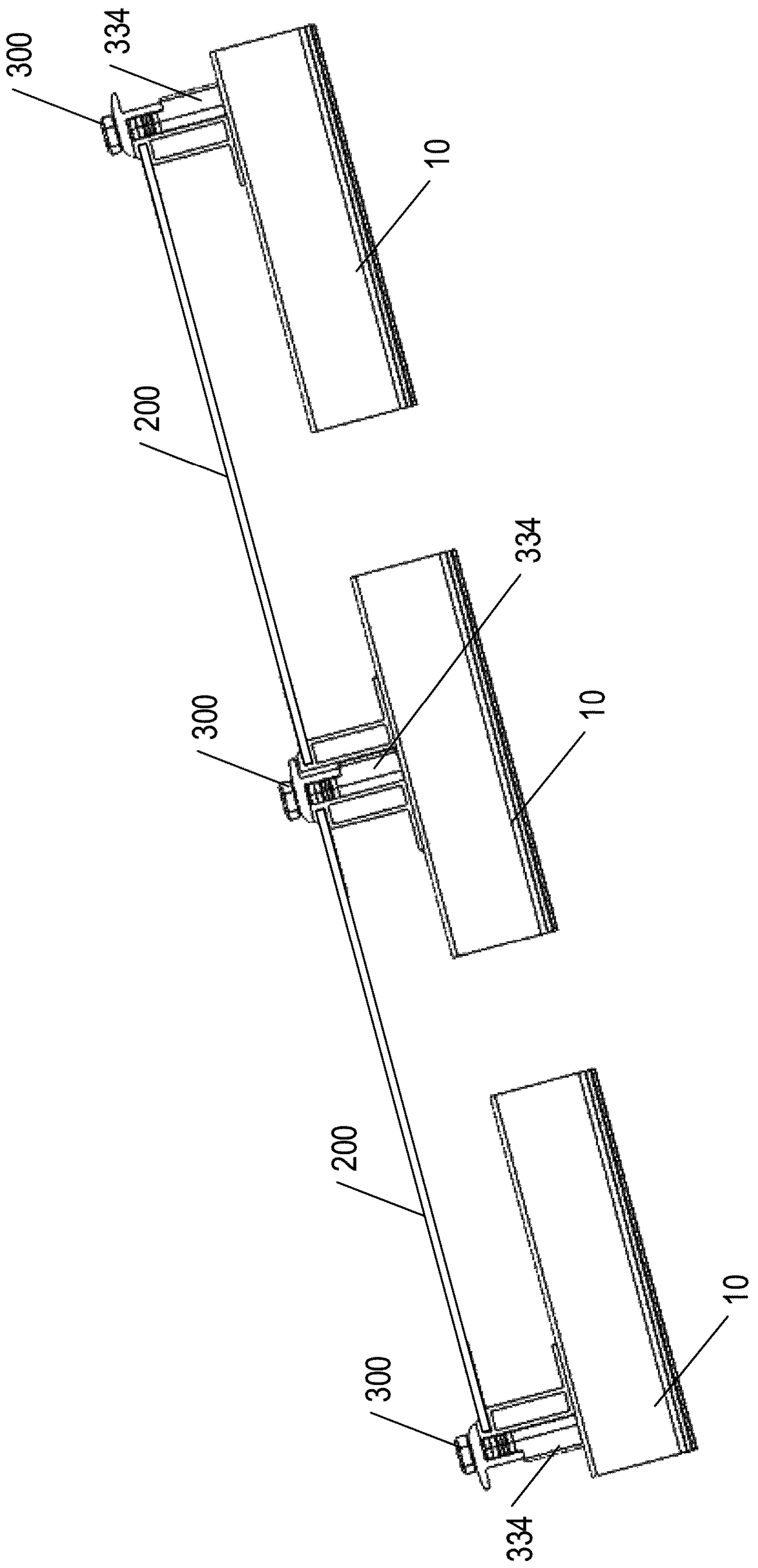

FIGS. 26A-26B illustrate a similar module 200 array installation, however the module 200 array installation shown therein omits the front skirt 210. In such embodiments, the bottom-most convertible clamp 300 may be reversed, such that the first top leg portion 322*c* secures only the first module 200 and nothing is secured under the second top leg portion 322*d*, and the second top leg portion 322*d* faces downward in the illustrated configurations. However, all of the clamps 300 illustrated in FIGS. 26A-26B may have identical configurations to those illustrated and described with respect to FIGS. 25A-25B.

To install the modules 200 and/or skirts 210 relative to the rails 10 via clamps 300, the rails 10 are first secured relative to a support surface (e.g., a roof). The rails may be continuous rails, or short rail sections (as shown in the configurations of FIGS. 25A-26B) positioned proximate gaps between adjacent modules 200.

A first convertible clamp 300 is slid into a rail 10 such that channel nut 321 is positioned within rail 10 to engage flanges of the rail 10 and the clamp component 322 is positioned above the top surface of the rail 10. If a skirt 210 is to be utilized, the first top leg portion 322*c* is facing down the roof. The skirt 210, having a height at least substantially equal to the height of modules 200 to be installed in the array, is inserted under the first top leg portion 322*c* such that the flat back surface is pressed against an end of the bottom leg portion 322*b*, and the flat bottom surface is pressed against the top surface of the rail 10. In embodiments in which the convertible clamp 300 comprises resilient member 334, the top leg portions 322*c-d* remain above the height of the skirt 210 while the fastening member 323 remains loose.

In certain embodiments (e.g., embodiments in which the thickness of the first top leg portion 322*c* is greater than the thickness of the second top leg portion 322*d*), the fastener member 323 is tightened to secure the skirt 210 onto the rail 10. This process may be repeated along the length of the skirt 210 at adjacently positioned rails 10 (as shown in FIG. 25A). A first module 200 may then be slid under the second top leg portion 322*d*. As mentioned, the second top leg portion 322*d* may have a thickness less than the thickness of the first top leg portion 322*c*, such that the module 200 may be slide under the second top leg portion 322*d* after the convertible clamp 300 has been tightened. However, in certain embodiments in which the thickness of the first top leg portion 322*c* and second top leg portion 322*d* are equal, the convertible clamp 300 is not tightened until the module 200 and the skirt 210 are positioned under respective top leg portions. Again, the process of securing the lower end of the first module 200 under the second top leg portions 322*d* of respective clamps 300 is repeated across the bottom edge of the module 200, at each of the adjacent rails 10.

In embodiments such as those shown in FIGS. 26A-26B, in which no skirt 210 is utilized, the clamps 300 are placed within rails 10 such that the first top leg portion 322*c* faces up the support surface (in the perspective illustrated) such that a bottom edge of module 200 is secured under the first top leg portion 322*c*. The second top leg portion 322*d* faces down the support surface, and in embodiments as shown in FIGS. 26A-26B, nothing is secured thereunder.

The middle and upper clamps 300 illustrated in all of FIGS. 25A-26B are installed similarly. The middle clamp is secured such that an upper end of the first module 200 is secured under the first top leg portion 322*c*, and the bottom edge of a second module 200 may be secured under the second top leg portion 322*d* of the convertible clamp 300. Like the bottom convertible clamp 300 the fastening member 323 is tightened to secure the convertible clamp 300 relative to the modules. It should be understood that a plurality of clamps 300 secured in this configuration may be provided in embodiments in which the module array comprises greater than two modules 200 (such that there are a plurality of interfaces between adjacent modules 200).

Finally, the top most convertible clamp 300 in the illustrated embodiments of FIGS. 25A-26B is secured relative to a top edge of the top-most module 200. The first top leg portion 322*c* is secured over the top edge of the module 200 (e.g., by tightening the fastener member 323) to secure the module 200 relative to the rail 10. In the illustrated embodiment of FIGS. 25A-26B, nothing is secured under the second top leg portion 322*d* of the clamp component 322.

Rail-Mounting Configurations

Figure 27:
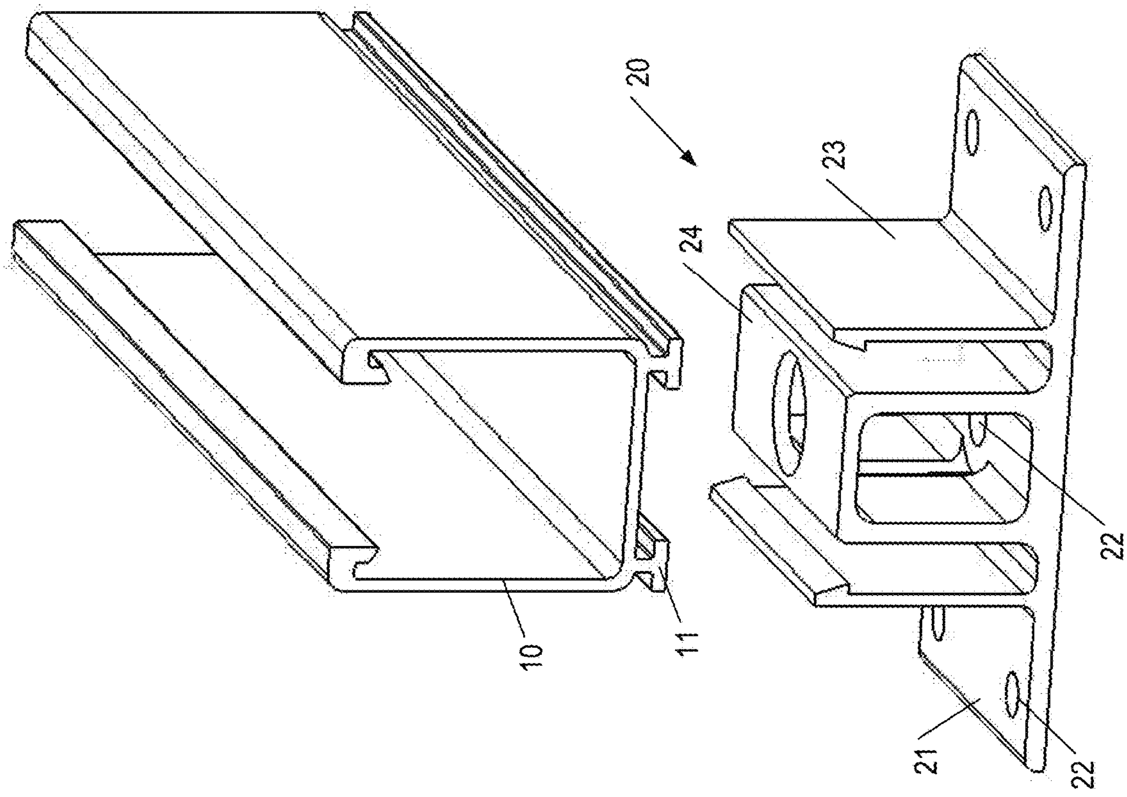
FIGS. 27-28 are perspective views of a surface mount secured relative to a rail according to one embodiment.
Figure 28:
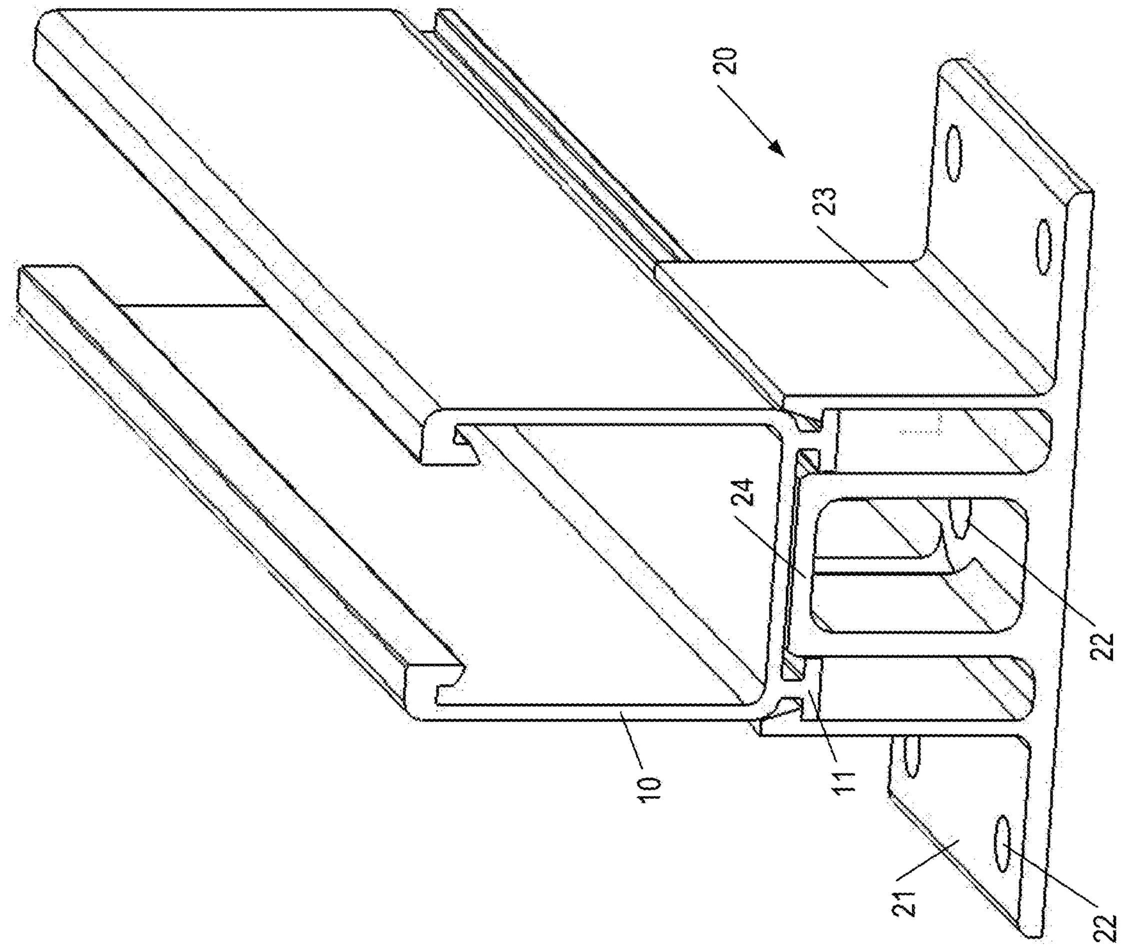

FIGS. 27-28 illustrate a rail securing mechanism configured to secure a rail 10 relative to surface mounts 20. In certain embodiments, the rails 10 may have a configuration as described in co-pending patent application Ser. No. 16/117,813 filed Aug. 30, 2018 the contents of which are incorporated herein by reference in their entirety.

As shown in FIG. 27-28, the surface mounts 20 may comprise at least substantially linear mount plates having a horizontal base surface 21 that may be placed against a support surface (e.g., a roof). The base surface 21 defines a plurality of fastener holes 22 therein configured to accept fasteners to secure the surface mounts 20 relative to the support surface. The surface mounts 20 additionally comprise vertical snap plates 23 extending perpendicularly away from the base surface 21. The vertical snap plates 23 are resilient plates having interference-fit members proximate an end thereof. In use, the vertical snap plates 23 are displayed outwardly as a rail 10 is pressed against the surface mounts 20 and snap around engagement features 11 of the rails 10 to secure the rails 10 relative to the surface mounts 20.

Figure 29A:
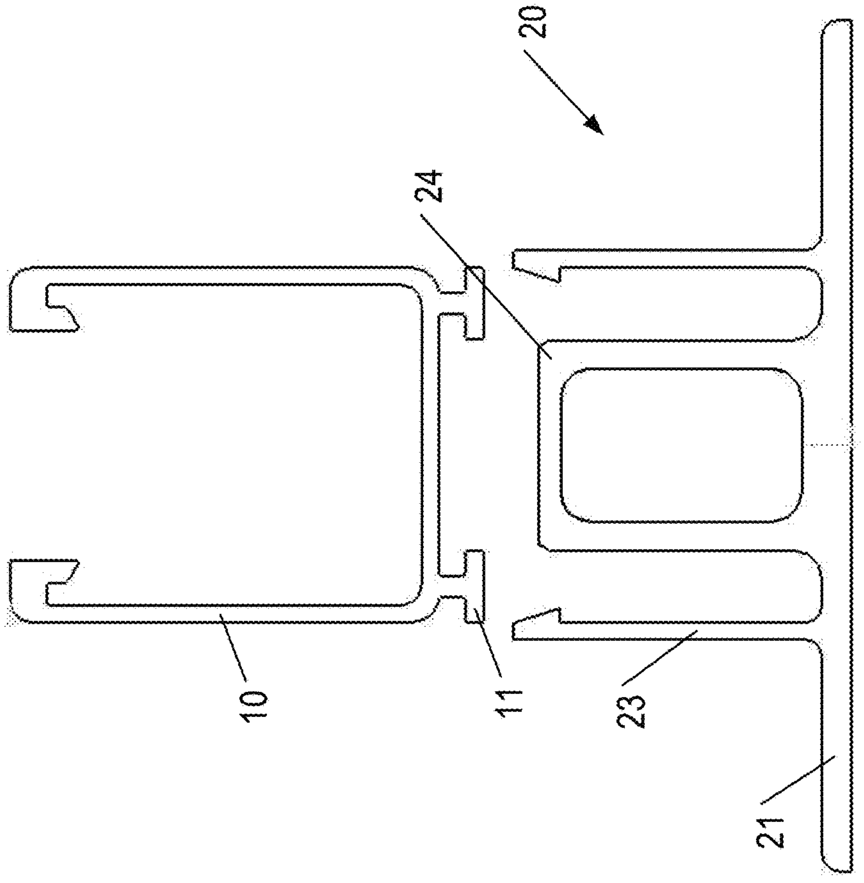
FIGS. 29A-29B are end views of a rail secured relative to a surface mount according to one embodiment.
Figure 29B:
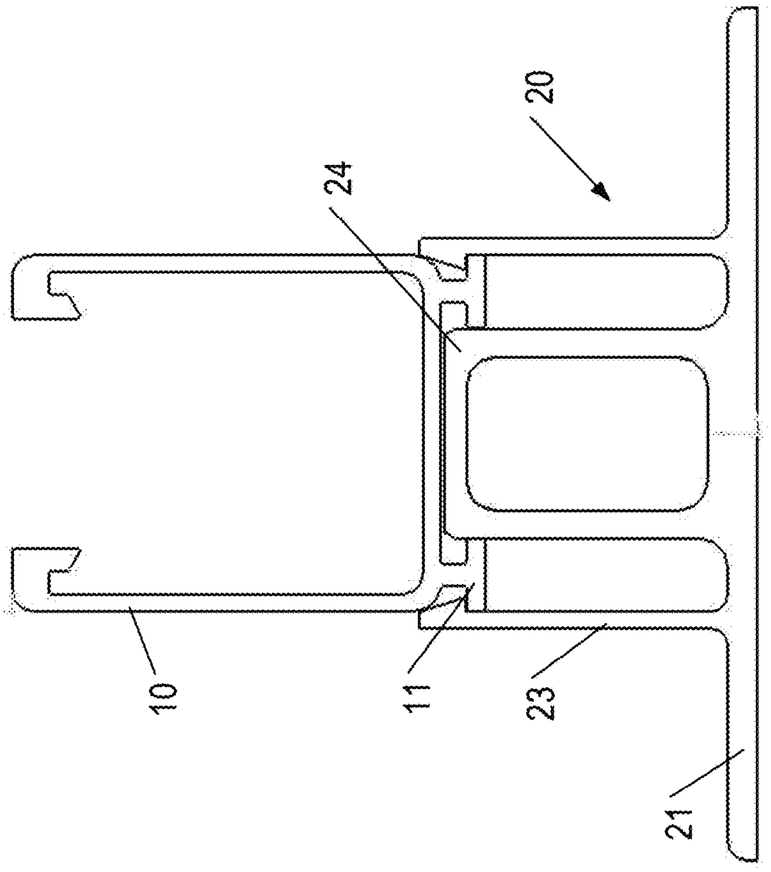
Figure 30A:
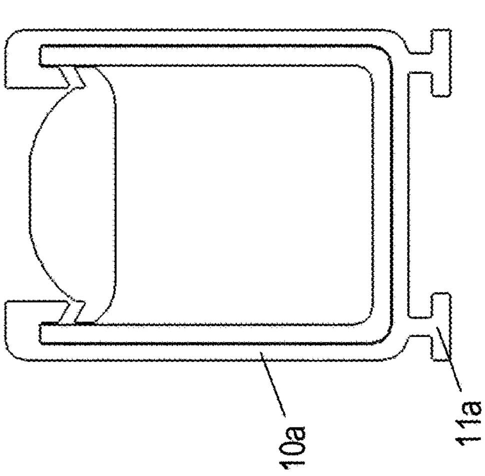
FIGS. 30A-30F are end views of various rail configurations according to various embodiments.
Figure 30B:
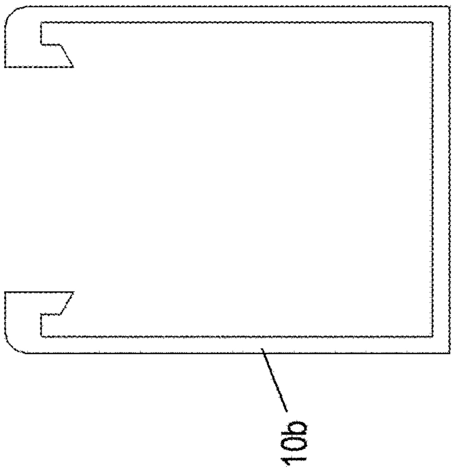
Figure 30C:
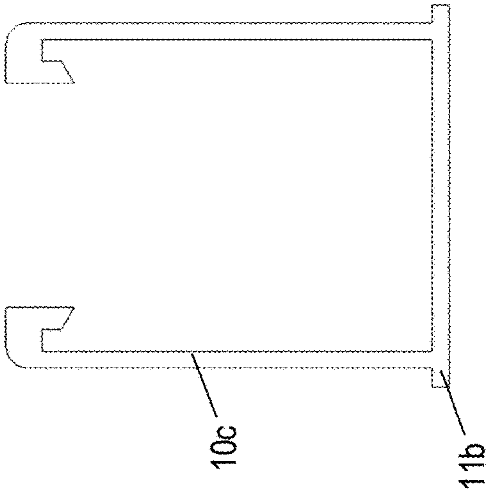
Figure 30D:
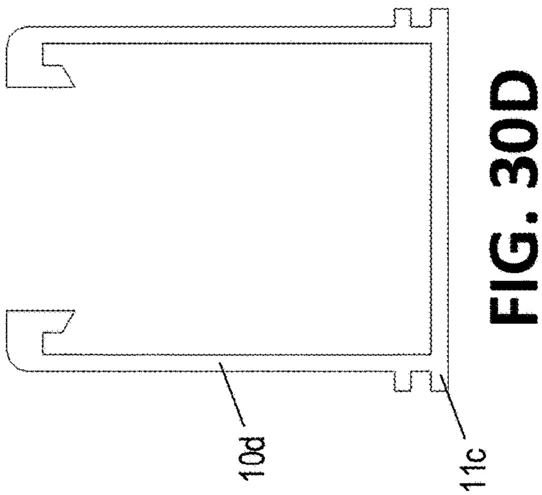
Figure 30E:
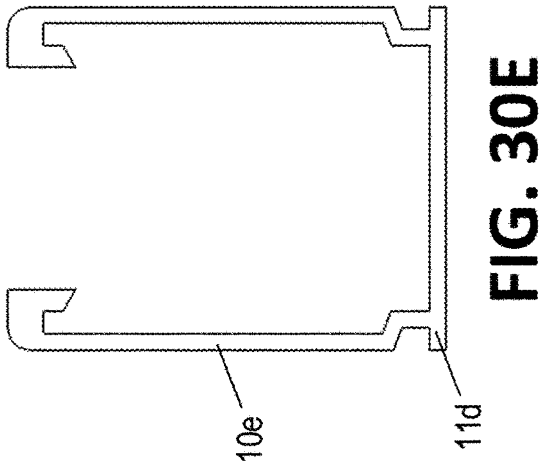
Figure 30F:
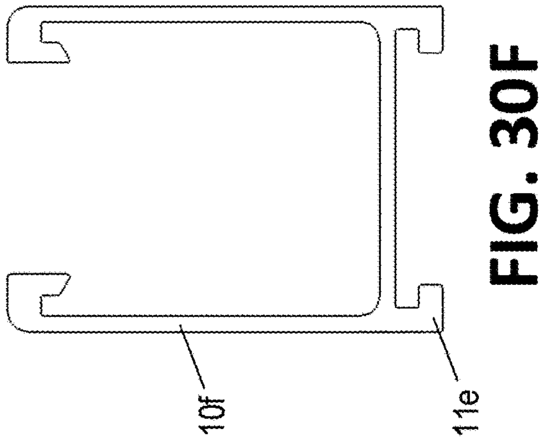

As shown in FIGS. 27-28, the surface mounts 20 additionally comprise a central support portion 24 between the vertical snap plates 23. The central support portion 24 is configured to engage a bottom surface of a rail 10 (e.g., between engagement members 11 of the rail 10) to support the rail 10 thereon. Thus, the central support portion 24 provides a retaining surface against the rail 10, such that the engagement features 11 of the rails 10 remain in contact with the engagement fit aspects of the vertical snap plates 23. Moreover, the central support portion 24 may be configured to engage interior side portions of the engagement features 11 (as shown in the end-views of FIGS. 29A-29B) to provide lateral support against sheer forces acting on the interface between the rail 10 and the surface mounts 20.

Although not shown, the surface mounts 20 may be configured for securing relative to a plurality of rail configurations, such as the rails 10*a*-10*f* shown in FIGS. 30A-30F. The engagement features 11*a*-11*e* may be configured to be secured relative to vertical snap plates 23 of the surface mounts 20.

CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A mounting system comprising:
- a mounting rail having an interior and comprising:
  - flanges positioned at a top portion of the mounting rail and defining a rail channel along a length of the mounting rail;
- a rail splice configured for being positioned partially within the interior of the mounting rail, the rail splice comprising:
  - a bottom wall and sidewalls collectively defining an exterior surface of the rail splice; and
  - a key feature on the exterior surface of the rail splice, the key feature defining a first rail splice portion along a length of the rail splice and a second rail splice portion along the length of the rail splice, wherein the key feature is configured to engage an end of the mounting rail when either the first rail splice portion or the second rail splice portion is positioned within the interior of the mounting rail; and
- a mounting clamp for securing one or more modules to the mounting rail, the mounting clamp comprising:
  - a clamp component defining a horizontal clamp surface; and
  - a channel nut configured for being positioned within the interior of the mounting rail, the channel nut comprising:
    - a top channel nut portion configured to fit within the rail channel at the top portion of the mounting rail when the channel nut is positioned within the interior of the mounting rail; and
    - a bottom channel nut portion configured for being positioned below the flanges of the mounting rail and between the sidewalls of the rail splice when the channel nut is positioned within the interior of the mounting rail such that the bottom channel nut portion is spaced from the sidewalls of the rail splice.

2. The mounting system of claim 1, wherein the key feature of the rail splice is centered along the length of the rail splice.

3. The mounting system of claim 1, wherein the sidewalls of the rail splice are biased to impart a compressive force onto the mounting rail to secure the rail splice to the mounting rail when the rail splice is positioned within the interior of the mounting rail.

4. The mounting system of claim 1, wherein the sidewalls of the rail splice are configured to engage the flanges positioned at the top portion of the mounting rail when the rail splice is positioned within the interior of the mounting rail.

5. The mounting system of claim 1, wherein the channel nut is configured to engage the flanges positioned at the top portion of the mounting rail when the channel nut is positioned within the interior of the mounting rail.

6. The mounting system of claim 1, wherein the one or more modules comprise at least a solar panel.

7. The mounting system of claim 6, wherein the clamp component is configured to engage a panel top surface of the solar panel.

8. The mounting system of claim 1, further comprising:
- a fastening member adjustably securing the clamp component to the channel nut, the fastening member having an adjustment head extending above a clamp top surface of the clamp component, wherein the fastening member is configured to, when tightened by rotating the adjustment head, move the clamp component toward the channel nut.

9. The mounting system of claim 8, wherein the mounting clamp further comprises:
- a compressible resilient member positioned between the clamp component and the channel nut, wherein the compressible resilient member is configured to support the clamp component a distance away from the channel nut.

10. The mounting system of claim 9, wherein the compressible resilient member comprises a metal material.

11. The mounting system of claim 9, wherein the compressible resilient member comprises:
- one or more side members, each of the one or more side members having a height measured between a base of the compressible resilient member and a top end of the respective side member of the one or more side members, and each side member of the compressible resilient member defines a vertical arm portion that, when compressed, forms substantially stacked sheet portions.

12. The mounting system of claim 11, wherein the compressible resilient member further comprises:
- a compressible resilient member aperture configured to receive at least a portion of the fastening member therein, wherein the compressible resilient member aperture is defined at least in part by an outer perimeter that at least partially surrounds the at least a portion of the fastening member.

13. The mounting system of claim 11, wherein the channel nut engages the rail channel when the channel nut is positioned within the interior of the mounting rail.

14. The mounting system of claim 11, wherein each vertical arm portion is defined by a plurality of thin resilient sheets having a sinusoidal shape.

15. The mounting system of claim 1, wherein the mounting rail comprises electrically conductive material.

16. The mounting system of claim 1, wherein the mounting rail comprises aluminum material.

17. The mounting system of claim 1, wherein the mounting rail comprises engagement features on a bottom surface of the mounting rail configured for securing the mounting rail to a surface mount.

18. The mounting system of claim 1, wherein the rail splice comprises electrically conductive material.

19. The mounting system of claim 1, wherein the rail splice comprises aluminum material.

20. The mounting system of claim 1, wherein the key feature is integrally formed.

* * * * *